United States Patent
Karafin et al.

(10) Patent No.: US 10,545,215 B2
(45) Date of Patent: Jan. 28, 2020

(54) 4D CAMERA TRACKING AND OPTICAL STABILIZATION

(71) Applicant: Google LLC, Mountain View, CA (US)

(72) Inventors: Jon Karafin, Morgan Hill, CA (US); Gang Pan, Fremont, CA (US); Thomas Nonn, Berkeley, CA (US); Jie Tan, Foster City, CA (US)

(73) Assignee: GOOGLE LLC, Mountain View, CA (US)

( * ) Notice: Subject to any disclaimer, the term of this patent is extended or adjusted under 35 U.S.C. 154(b) by 58 days.

(21) Appl. No.: 15/703,553

(22) Filed: Sep. 13, 2017

(65) Prior Publication Data

US 2019/0079158 A1    Mar. 14, 2019

(51) Int. Cl.
    *G01S 3/78*     (2006.01)
    *H04N 5/232*    (2006.01)
    (Continued)

(52) U.S. Cl.
    CPC .......... *G01S 3/7803* (2013.01); *G06K 9/6202* (2013.01); *G06T 7/11* (2017.01); *H04N 5/22541* (2018.08); *H04N 5/23248* (2013.01); *H04N 5/23267* (2013.01); *H04N 13/204* (2018.05); *G06T 2207/10028* (2013.01); *G06T 2207/10052* (2013.01); *G06T 2207/30241* (2013.01); *G06T 2207/30244* (2013.01)

(58) Field of Classification Search
    CPC .................. G06T 15/20; G06T 15/205; G06T 2207/10052; G06T 7/11; G01S 3/7803; G06K 9/6202; H04N 5/23267; H04N 13/204; H04N 5/23248; H04N 5/22541
    See application file for complete search history.

(56) References Cited

U.S. PATENT DOCUMENTS

| 725,567 A   | 4/1903 | Ives |
| 4,383,170 A | 5/1983 | Takagi et al. |

(Continued)

FOREIGN PATENT DOCUMENTS

| CN | 101226292 | 7/2008 |
| CN | 101309359 | 11/2008 |

(Continued)

OTHER PUBLICATIONS

Smith et al, "Light Field Video Stabilization", IEEE International Conference on Computer Vision (ICCV), Sep. 29-Oct. 2, 2009 (Year: 2009).*

(Continued)

*Primary Examiner* — David E Harvey

(57) ABSTRACT

A light-field video stream may be processed to modify the camera pathway from which the light-field video stream is projected. A plurality of target pixels may be selected, in a plurality of key frames of the light-field video stream. The target pixels may be used to generate a camera pathway indicative of motion of the camera during generation of the light-field video stream. The camera pathway may be adjusted to generate an adjusted camera pathway. This may be done, for example, to carry out image stabilization. The light-field video stream may be projected to a viewpoint defined by the adjusted camera pathway to generate a projected video stream with the image stabilization.

18 Claims, 13 Drawing Sheets

(51) Int. Cl.
  *G06K 9/62* (2006.01)
  *G06T 7/11* (2017.01)
  *H04N 13/204* (2018.01)
  *H04N 5/225* (2006.01)

(56) References Cited

U.S. PATENT DOCUMENTS

| | | | |
|---|---|---|---|
| 4,661,986 A | 4/1987 | Adelson |
| 4,694,185 A | 9/1987 | Weiss |
| 4,920,419 A | 4/1990 | Easterly |
| 5,076,687 A | 12/1991 | Adelson |
| 5,077,810 A | 12/1991 | D'Luna |
| 5,251,019 A | 10/1993 | Moorman et al. |
| 5,282,045 A | 1/1994 | Mimura et al. |
| 5,499,069 A | 3/1996 | Griffith |
| 5,572,034 A | 11/1996 | Karellas |
| 5,610,390 A | 3/1997 | Miyano |
| 5,748,371 A | 5/1998 | Cathey, Jr. et al. |
| 5,757,423 A | 5/1998 | Tanaka et al. |
| 5,818,525 A | 10/1998 | Elabd |
| 5,835,267 A | 11/1998 | Mason et al. |
| 5,907,619 A | 5/1999 | Davis |
| 5,949,433 A | 9/1999 | Klotz |
| 5,974,215 A | 10/1999 | Bilbro et al. |
| 6,005,936 A | 12/1999 | Shimizu et al. |
| 6,021,241 A | 2/2000 | Bilbro et al. |
| 6,023,523 A | 2/2000 | Cohen et al. |
| 6,028,606 A | 2/2000 | Kolb et al. |
| 6,034,690 A | 3/2000 | Gallery et al. |
| 6,061,083 A | 5/2000 | Aritake et al. |
| 6,061,400 A | 5/2000 | Pearlstein et al. |
| 6,069,565 A | 5/2000 | Stern et al. |
| 6,075,889 A | 6/2000 | Hamilton, Jr. et al. |
| 6,091,860 A | 7/2000 | Dimitri |
| 6,097,394 A | 8/2000 | Levoy et al. |
| 6,115,556 A | 9/2000 | Reddington |
| 6,137,100 A | 10/2000 | Fossum et al. |
| 6,169,285 B1 | 1/2001 | Pertrillo et al. |
| 6,201,899 B1 | 3/2001 | Bergen |
| 6,221,687 B1 | 4/2001 | Abramovich |
| 6,320,979 B1 | 11/2001 | Melen |
| 6,424,351 B1 | 7/2002 | Bishop et al. |
| 6,448,544 B1 | 9/2002 | Stanton et al. |
| 6,466,207 B1 | 10/2002 | Gortler et al. |
| 6,476,805 B1 | 11/2002 | Shum et al. |
| 6,479,827 B1 | 11/2002 | Hamamoto et al. |
| 6,483,535 B1 | 11/2002 | Tamburrino et al. |
| 6,529,265 B1 | 3/2003 | Henningsen |
| 6,577,342 B1 | 6/2003 | Webster |
| 6,587,147 B1 | 7/2003 | Li |
| 6,597,859 B1 | 7/2003 | Leinhardt et al. |
| 6,606,099 B2 | 8/2003 | Yamada |
| 6,658,168 B1 | 12/2003 | Kim |
| 6,674,430 B1 | 1/2004 | Kaufman et al. |
| 6,687,419 B1 | 2/2004 | Atkin |
| 6,768,980 B1 | 7/2004 | Meyer et al. |
| 6,785,667 B2 | 8/2004 | Orbanes et al. |
| 6,833,865 B1 | 12/2004 | Fuller et al. |
| 6,842,297 B2 | 1/2005 | Dowski, Jr. et al. |
| 6,900,841 B1 | 5/2005 | Mihara |
| 6,924,841 B2 | 8/2005 | Jones |
| 6,927,922 B2 | 8/2005 | George et al. |
| 7,015,954 B1 | 3/2006 | Foote et al. |
| 7,025,515 B2 | 4/2006 | Woods |
| 7,034,866 B1 | 4/2006 | Colmenarez et al. |
| 7,079,698 B2 | 7/2006 | Kobayashi |
| 7,102,666 B2 | 9/2006 | Kanade et al. |
| 7,164,807 B2 | 1/2007 | Morton |
| 7,206,022 B2 | 4/2007 | Miller et al. |
| 7,239,345 B1 | 7/2007 | Rogina |
| 7,286,295 B1 | 10/2007 | Sweatt et al. |
| 7,304,670 B1 | 12/2007 | Hussey et al. |
| 7,329,856 B2 | 2/2008 | Ma et al. |
| 7,336,430 B2 | 2/2008 | George |
| 7,417,670 B1 | 8/2008 | Linzer et al. |
| 7,469,381 B2 | 12/2008 | Ording |
| 7,477,304 B2 | 1/2009 | Hu |
| 7,587,109 B1 | 9/2009 | Reininger |
| 7,620,309 B2 | 11/2009 | Georgiev |
| 7,623,726 B1 | 11/2009 | Georgiev |
| 7,633,513 B2 | 12/2009 | Kondo et al. |
| 7,683,951 B2 | 3/2010 | Aotsuka |
| 7,687,757 B1 | 3/2010 | Tseng et al. |
| 7,723,662 B2 | 5/2010 | Levoy et al. |
| 7,724,952 B2 | 5/2010 | Shum et al. |
| 7,748,022 B1 | 6/2010 | Frazier |
| 7,847,825 B2 | 12/2010 | Aoki et al. |
| 7,936,377 B2 | 5/2011 | Friedhoff et al. |
| 7,936,392 B2 | 5/2011 | Ng et al. |
| 7,941,634 B2 | 5/2011 | Georgi |
| 7,945,653 B2 | 5/2011 | Zuckerberg et al. |
| 7,949,252 B1 | 5/2011 | Georgiev |
| 7,982,776 B2 | 7/2011 | Dunki-Jacobs et al. |
| 8,013,904 B2 | 9/2011 | Tan et al. |
| 8,085,391 B2 | 12/2011 | Machida et al. |
| 8,106,856 B2 | 1/2012 | Matas et al. |
| 8,115,814 B2 | 2/2012 | Iwase et al. |
| 8,155,456 B2 | 4/2012 | Babacan |
| 8,155,478 B2 | 4/2012 | Vitsnudel et al. |
| 8,189,089 B1 | 5/2012 | Georgiev et al. |
| 8,228,417 B1 | 7/2012 | Georgiev et al. |
| 8,248,515 B2 | 8/2012 | Ng et al. |
| 8,259,198 B2 | 9/2012 | Cote et al. |
| 8,264,546 B2 | 9/2012 | Witt |
| 8,279,325 B2 | 10/2012 | Pitts et al. |
| 8,289,440 B2 | 10/2012 | Knight et al. |
| 8,290,358 B1 | 10/2012 | Georgiev |
| 8,310,554 B2 | 11/2012 | Aggarwal et al. |
| 8,315,476 B1 | 11/2012 | Georgiev et al. |
| 8,345,144 B1 | 1/2013 | Georgiev et al. |
| 8,400,533 B1 | 3/2013 | Szedo |
| 8,400,555 B1 * | 3/2013 | Georgiev ........... H04N 5/23212 348/222.1 |
| 8,427,548 B2 | 4/2013 | Lim et al. |
| 8,442,397 B2 | 5/2013 | Kang et al. |
| 8,446,516 B2 | 5/2013 | Pitts et al. |
| 8,494,304 B2 | 7/2013 | Venable et al. |
| 8,531,535 B2 * | 9/2013 | Kwatra ................. G06T 3/00 348/155 |
| 8,531,581 B2 | 9/2013 | Shroff |
| 8,542,933 B2 | 9/2013 | Venkataraman et al. |
| 8,559,705 B2 | 10/2013 | Ng |
| 8,570,426 B2 | 10/2013 | Pitts et al. |
| 8,577,216 B2 | 11/2013 | Li et al. |
| 8,581,998 B2 | 11/2013 | Ohno |
| 8,589,374 B2 | 11/2013 | Chaudhri |
| 8,593,564 B2 | 11/2013 | Border et al. |
| 8,605,199 B2 | 12/2013 | Imai |
| 8,614,764 B2 | 12/2013 | Pitts et al. |
| 8,619,082 B1 * | 12/2013 | Ciurea .................. H04N 13/232 345/427 |
| 8,629,930 B2 | 1/2014 | Brueckner et al. |
| 8,665,440 B1 | 3/2014 | Kompaniets et al. |
| 8,675,073 B2 | 3/2014 | Aagaard et al. |
| 8,724,014 B2 | 5/2014 | Ng et al. |
| 8,736,710 B2 | 5/2014 | Spielberg |
| 8,736,751 B2 | 5/2014 | Yun |
| 8,749,620 B1 | 6/2014 | Pitts et al. |
| 8,749,648 B1 * | 6/2014 | Kohn ................. H04N 5/23258 348/208.2 |
| 8,750,509 B2 | 6/2014 | Renkis |
| 8,754,829 B2 | 6/2014 | Lapstun |
| 8,760,566 B2 | 6/2014 | Pitts et al. |
| 8,768,102 B1 | 7/2014 | Ng et al. |
| 8,797,321 B1 | 8/2014 | Bertolami et al. |
| 8,811,769 B1 | 8/2014 | Pitts et al. |
| 8,831,377 B2 | 9/2014 | Pitts et al. |
| 8,860,856 B2 | 10/2014 | Wetzstein et al. |
| 8,879,901 B2 | 11/2014 | Caldwell et al. |
| 8,903,232 B1 | 12/2014 | Caldwell |
| 8,908,058 B2 | 12/2014 | Akeley et al. |
| 8,948,545 B2 | 2/2015 | Akeley et al. |
| 8,953,882 B2 | 2/2015 | Lim et al. |
| 8,971,625 B2 | 3/2015 | Pitts et al. |

(56) References Cited

U.S. PATENT DOCUMENTS

| | | |
|---|---|---|
| 8,976,288 B2 | 3/2015 | Ng et al. |
| 8,988,317 B1 | 3/2015 | Liang et al. |
| 8,995,785 B2 | 3/2015 | Knight et al. |
| 8,997,021 B2 | 3/2015 | Liang et al. |
| 9,001,226 B1 | 4/2015 | Ng et al. |
| 9,013,611 B1 | 4/2015 | Szedo |
| 9,106,914 B2 | 8/2015 | Doser |
| 9,131,155 B1 * | 9/2015 | Dolgin ............... H04N 5/23248 |
| 9,172,853 B2 | 10/2015 | Pitts et al. |
| 9,184,199 B2 | 11/2015 | Pitts et al. |
| 9,201,193 B1 | 12/2015 | Smith |
| 9,210,391 B1 | 12/2015 | Mills |
| 9,214,013 B2 | 12/2015 | Venkataraman et al. |
| 9,232,138 B1 * | 1/2016 | Baldwin ............ H04N 5/23264 |
| 9,294,662 B2 | 3/2016 | Vondran, Jr. et al. |
| 9,300,932 B2 | 3/2016 | Knight et al. |
| 9,305,375 B2 | 4/2016 | Akeley |
| 9,305,956 B2 | 4/2016 | Pittes et al. |
| 9,307,148 B1 * | 4/2016 | Baldwin ............ H04N 5/23267 |
| 9,386,288 B2 | 7/2016 | Akeley et al. |
| 9,392,153 B2 | 7/2016 | Myhre et al. |
| 9,419,049 B2 | 8/2016 | Pitts et al. |
| 9,467,607 B2 | 10/2016 | Ng et al. |
| 9,497,380 B1 | 11/2016 | Jannard et al. |
| 9,607,424 B2 | 3/2017 | Ng et al. |
| 9,628,684 B2 | 4/2017 | Liang et al. |
| 9,635,332 B2 | 4/2017 | Carroll et al. |
| 9,639,945 B2 | 5/2017 | Oberheu et al. |
| 9,647,150 B2 | 5/2017 | Blasco Claret |
| 9,681,069 B2 | 6/2017 | El-Ghoroury et al. |
| 9,774,800 B2 | 9/2017 | El-Ghoroury et al. |
| 9,858,649 B2 | 1/2018 | Liang et al. |
| 9,866,810 B2 | 1/2018 | Knight et al. |
| 9,888,179 B1 * | 2/2018 | Liang ................. H04N 5/23258 |
| 9,900,510 B1 | 2/2018 | Karafin et al. |
| 9,979,909 B2 | 5/2018 | Kuang et al. |
| 2001/0048968 A1 | 12/2001 | Cox et al. |
| 2001/0053202 A1 | 12/2001 | Mazess et al. |
| 2002/0001395 A1 | 1/2002 | Davis et al. |
| 2002/0015048 A1 | 2/2002 | Nister |
| 2002/0061131 A1 * | 5/2002 | Sawhney ............ G06T 15/205 |
| | | 382/154 |
| 2002/0109783 A1 | 8/2002 | Hayashi et al. |
| 2002/0159030 A1 | 10/2002 | Frey et al. |
| 2002/0199106 A1 | 12/2002 | Hayashi |
| 2003/0081145 A1 | 5/2003 | Seaman et al. |
| 2003/0103670 A1 | 6/2003 | Schoelkopf et al. |
| 2003/0117511 A1 | 6/2003 | Betz et al. |
| 2003/0123700 A1 | 7/2003 | Wakao |
| 2003/0133018 A1 | 7/2003 | Ziemkowski |
| 2003/0147252 A1 | 8/2003 | Fioravanti |
| 2003/0156077 A1 | 8/2003 | Balogh |
| 2004/0002179 A1 | 1/2004 | Barton et al. |
| 2004/0012688 A1 | 1/2004 | Tinnerinno et al. |
| 2004/0012689 A1 | 1/2004 | Tinnerinno et al. |
| 2004/0101166 A1 | 5/2004 | Williams et al. |
| 2004/0114176 A1 | 6/2004 | Bodin et al. |
| 2004/0135780 A1 | 7/2004 | Nims |
| 2004/0189686 A1 | 9/2004 | Tanguay et al. |
| 2004/0257360 A1 | 12/2004 | Sieckmann |
| 2005/0031203 A1 | 2/2005 | Fukuda |
| 2005/0049500 A1 | 3/2005 | Babu et al. |
| 2005/0052543 A1 | 3/2005 | Li et al. |
| 2005/0080602 A1 | 4/2005 | Snyder et al. |
| 2005/0162540 A1 | 7/2005 | Yata |
| 2005/0212918 A1 | 9/2005 | Serra et al. |
| 2005/0276441 A1 | 12/2005 | Debevec |
| 2006/0023066 A1 | 2/2006 | Li et al. |
| 2006/0050170 A1 | 3/2006 | Tanaka |
| 2006/0056040 A1 | 3/2006 | Lan |
| 2006/0056604 A1 | 3/2006 | Sylthe et al. |
| 2006/0072175 A1 | 4/2006 | Oshino |
| 2006/0082879 A1 | 4/2006 | Miyoshi et al. |
| 2006/0130017 A1 | 6/2006 | Cohen et al. |
| 2006/0208259 A1 | 9/2006 | Jeon |
| 2006/0248348 A1 | 11/2006 | Wakao et al. |
| 2006/0256226 A1 | 11/2006 | Alon et al. |
| 2006/0274210 A1 | 12/2006 | Kim |
| 2006/0285741 A1 | 12/2006 | Subbarao |
| 2007/0008317 A1 | 1/2007 | Lundstrom |
| 2007/0019883 A1 | 1/2007 | Wong et al. |
| 2007/0030357 A1 | 2/2007 | Levien et al. |
| 2007/0033588 A1 | 2/2007 | Landsman |
| 2007/0052810 A1 | 3/2007 | Monroe |
| 2007/0071316 A1 | 3/2007 | Kubo |
| 2007/0081081 A1 | 4/2007 | Cheng |
| 2007/0097206 A1 | 5/2007 | Houvener |
| 2007/0103558 A1 | 5/2007 | Cai et al. |
| 2007/0113198 A1 | 5/2007 | Robertson et al. |
| 2007/0140676 A1 | 6/2007 | Nakahara |
| 2007/0188613 A1 | 8/2007 | Norbori et al. |
| 2007/0201853 A1 | 8/2007 | Petschnigg |
| 2007/0229653 A1 | 10/2007 | Matusik et al. |
| 2007/0230944 A1 | 10/2007 | Georgiev |
| 2007/0269108 A1 | 11/2007 | Steinberg et al. |
| 2008/0007626 A1 | 1/2008 | Wernersson |
| 2008/0012988 A1 | 1/2008 | Baharav et al. |
| 2008/0018668 A1 | 1/2008 | Yamauchi |
| 2008/0031537 A1 | 2/2008 | Gutkowicz-Krusin et al. |
| 2008/0049113 A1 | 2/2008 | Hirai |
| 2008/0056569 A1 | 3/2008 | Williams et al. |
| 2008/0122940 A1 | 5/2008 | Mori |
| 2008/0129728 A1 | 6/2008 | Satoshi |
| 2008/0144952 A1 | 6/2008 | Chen et al. |
| 2008/0152215 A1 | 6/2008 | Horie et al. |
| 2008/0168404 A1 | 7/2008 | Ording |
| 2008/0180792 A1 | 7/2008 | Georgiev |
| 2008/0187305 A1 | 8/2008 | Raskar et al. |
| 2008/0193026 A1 | 8/2008 | Horie et al. |
| 2008/0205871 A1 | 8/2008 | Utagawa |
| 2008/0226274 A1 | 9/2008 | Spielberg |
| 2008/0232680 A1 | 9/2008 | Berestov et al. |
| 2008/0253652 A1 | 10/2008 | Gupta et al. |
| 2008/0260291 A1 | 10/2008 | Alakarhu et al. |
| 2008/0266688 A1 | 10/2008 | Errando Smet et al. |
| 2008/0277566 A1 | 11/2008 | Utagawa |
| 2008/0309813 A1 | 12/2008 | Watanabe |
| 2008/0316301 A1 | 12/2008 | Givon |
| 2009/0027542 A1 | 1/2009 | Yamamoto et al. |
| 2009/0041381 A1 | 2/2009 | Georgiev et al. |
| 2009/0041448 A1 | 2/2009 | Georgiev et al. |
| 2009/0070710 A1 | 3/2009 | Kagaya |
| 2009/0128658 A1 | 5/2009 | Hayasaka et al. |
| 2009/0128669 A1 | 5/2009 | Ng et al. |
| 2009/0135258 A1 | 5/2009 | Nozaki |
| 2009/0140131 A1 | 6/2009 | Utagawa |
| 2009/0102956 A1 | 7/2009 | Georgiev |
| 2009/0185051 A1 | 7/2009 | Sano |
| 2009/0185801 A1 | 7/2009 | Georgiev et al. |
| 2009/0190022 A1 | 7/2009 | Ichimura |
| 2009/0190024 A1 | 7/2009 | Hayasaka et al. |
| 2009/0195689 A1 | 8/2009 | Hwang et al. |
| 2009/0202235 A1 | 8/2009 | Li et al. |
| 2009/0204813 A1 | 8/2009 | Kwan |
| 2009/0273843 A1 | 11/2009 | Raskar et al. |
| 2009/0295829 A1 | 12/2009 | Georgiev et al. |
| 2009/0309973 A1 | 12/2009 | Kogane |
| 2009/0310885 A1 | 12/2009 | Tamaru |
| 2009/0321861 A1 | 12/2009 | Oliver et al. |
| 2010/0003024 A1 | 1/2010 | Agrawal et al. |
| 2010/0021001 A1 | 1/2010 | Honsinger et al. |
| 2010/0026852 A1 | 2/2010 | Ng et al. |
| 2010/0033617 A1 * | 2/2010 | Forutanpour ........... G06T 7/564 |
| | | 348/345 |
| 2010/0050120 A1 | 2/2010 | Ohazama et al. |
| 2010/0060727 A1 | 3/2010 | Steinberg et al. |
| 2010/0097444 A1 | 4/2010 | Lablans |
| 2010/0103311 A1 | 4/2010 | Makii |
| 2010/0107068 A1 | 4/2010 | Butcher et al. |
| 2010/0111489 A1 | 5/2010 | Presler |
| 2010/0123784 A1 | 5/2010 | Ding et al. |
| 2010/0141780 A1 | 6/2010 | Tan et al. |
| 2010/0142839 A1 | 6/2010 | Lakus-Becker |

(56) References Cited

U.S. PATENT DOCUMENTS

| | | | |
|---|---|---|---|
| 2010/0188503 A1* | 7/2010 | Tsai | G01C 21/20 348/142 |
| 2010/0201789 A1 | 8/2010 | Yahagi | |
| 2010/0253782 A1 | 10/2010 | Elazary | |
| 2010/0265385 A1 | 10/2010 | Knight et al. | |
| 2010/0277629 A1 | 11/2010 | Tanaka | |
| 2010/0303288 A1 | 12/2010 | Malone | |
| 2010/0328485 A1 | 12/2010 | Imamura et al. | |
| 2011/0018903 A1 | 1/2011 | Lapstun et al. | |
| 2011/0019056 A1 | 1/2011 | Hirsch et al. | |
| 2011/0025827 A1 | 2/2011 | Shpunt et al. | |
| 2011/0050864 A1 | 3/2011 | Bond | |
| 2011/0050909 A1 | 3/2011 | Ellenby | |
| 2011/0069175 A1 | 3/2011 | Mistretta et al. | |
| 2011/0075729 A1 | 3/2011 | Dane et al. | |
| 2011/0090255 A1 | 4/2011 | Wilson et al. | |
| 2011/0123183 A1 | 5/2011 | Adelsberger et al. | |
| 2011/0129120 A1 | 6/2011 | Chan | |
| 2011/0129165 A1 | 6/2011 | Lim et al. | |
| 2011/0148764 A1 | 6/2011 | Gao | |
| 2011/0149074 A1 | 6/2011 | Lee et al. | |
| 2011/0169994 A1 | 7/2011 | DiFrancesco et al. | |
| 2011/0205384 A1 | 8/2011 | Zamowski et al. | |
| 2011/0221947 A1 | 9/2011 | Awazu | |
| 2011/0242334 A1 | 10/2011 | Wilburn et al. | |
| 2011/0242352 A1 | 10/2011 | Hikosaka | |
| 2011/0261164 A1 | 10/2011 | Olesen et al. | |
| 2011/0261205 A1 | 10/2011 | Sun | |
| 2011/0267263 A1 | 11/2011 | Hinckley | |
| 2011/0273466 A1 | 11/2011 | Imai et al. | |
| 2011/0133649 A1 | 12/2011 | Bales et al. | |
| 2011/0292258 A1 | 12/2011 | Adler | |
| 2011/0298960 A1 | 12/2011 | Tan et al. | |
| 2011/0304745 A1 | 12/2011 | Wang et al. | |
| 2011/0311046 A1 | 12/2011 | Oka | |
| 2011/0316968 A1 | 12/2011 | Taguchi et al. | |
| 2012/0014837 A1 | 1/2012 | Fehr et al. | |
| 2012/0050562 A1 | 3/2012 | Perwass et al. | |
| 2012/0056889 A1 | 3/2012 | Carter et al. | |
| 2012/0057040 A1 | 3/2012 | Park et al. | |
| 2012/0057806 A1 | 3/2012 | Backlund et al. | |
| 2012/0062755 A1 | 3/2012 | Takahashi et al. | |
| 2012/0132803 A1 | 5/2012 | Hirato et al. | |
| 2012/0133746 A1 | 5/2012 | Bigioi et al. | |
| 2012/0147205 A1 | 6/2012 | Lelescu et al. | |
| 2012/0176481 A1 | 7/2012 | Lukk et al. | |
| 2012/0188344 A1 | 7/2012 | Imai | |
| 2012/0201475 A1 | 8/2012 | Carmel et al. | |
| 2012/0206574 A1 | 8/2012 | Shikata et al. | |
| 2012/0218463 A1 | 8/2012 | Benezra et al. | |
| 2012/0224787 A1 | 9/2012 | Imai | |
| 2012/0229691 A1 | 9/2012 | Hiasa et al. | |
| 2012/0249529 A1 | 10/2012 | Matsumoto et al. | |
| 2012/0249550 A1 | 10/2012 | Akeley | |
| 2012/0249819 A1 | 10/2012 | Imai | |
| 2012/0251131 A1 | 10/2012 | Henderson et al. | |
| 2012/0257065 A1 | 10/2012 | Velarde et al. | |
| 2012/0257795 A1 | 10/2012 | Kim et al. | |
| 2012/0272271 A1 | 10/2012 | Nishizawa et al. | |
| 2012/0287246 A1 | 11/2012 | Katayama | |
| 2012/0287296 A1 | 11/2012 | Fukui | |
| 2012/0287329 A1 | 11/2012 | Yahata | |
| 2012/0293075 A1 | 11/2012 | Engelen et al. | |
| 2012/0300091 A1 | 11/2012 | Shroff et al. | |
| 2012/0237222 A9 | 12/2012 | Ng et al. | |
| 2012/0307084 A1 | 12/2012 | Mantzel et al. | |
| 2012/0307085 A1* | 12/2012 | Mantzel | H04N 5/23248 348/208.4 |
| 2013/0002902 A1 | 1/2013 | Ito | |
| 2013/0002936 A1 | 1/2013 | Hirama et al. | |
| 2013/0021486 A1 | 1/2013 | Richardson | |
| 2013/0038696 A1 | 2/2013 | Ding et al. | |
| 2013/0041215 A1 | 2/2013 | McDowall | |
| 2013/0044290 A1 | 2/2013 | Kawamura | |
| 2013/0050546 A1 | 2/2013 | Kano | |
| 2013/0064453 A1 | 3/2013 | Nagasaka et al. | |
| 2013/0064532 A1 | 3/2013 | Caldwell et al. | |
| 2013/0070059 A1 | 3/2013 | Kushida | |
| 2013/0070060 A1 | 3/2013 | Chatterjee et al. | |
| 2013/0077880 A1 | 3/2013 | Venkataraman et al. | |
| 2013/0082905 A1 | 4/2013 | Ranieri et al. | |
| 2013/0088616 A1 | 4/2013 | Ingrassia, Jr. | |
| 2013/0093844 A1 | 4/2013 | Shuto | |
| 2013/0093859 A1 | 4/2013 | Nakamura | |
| 2013/0094101 A1 | 4/2013 | Oguchi | |
| 2013/0107085 A1 | 5/2013 | Ng et al. | |
| 2013/0113981 A1 | 5/2013 | Knight et al. | |
| 2013/0120356 A1 | 5/2013 | Georgiev et al. | |
| 2013/0120605 A1 | 5/2013 | Georgiev et al. | |
| 2013/0120636 A1 | 5/2013 | Baer | |
| 2013/0127901 A1 | 5/2013 | Georgiev et al. | |
| 2013/0127993 A1* | 5/2013 | Wang | H04N 13/221 348/46 |
| 2013/0128052 A1 | 5/2013 | Catrein et al. | |
| 2013/0128081 A1 | 5/2013 | Georgiev et al. | |
| 2013/0128087 A1 | 5/2013 | Georgiev et al. | |
| 2013/0129192 A1* | 5/2013 | Wang | H04N 13/246 382/154 |
| 2013/0135448 A1 | 5/2013 | Nagumo et al. | |
| 2013/0176481 A1 | 7/2013 | Holmes et al. | |
| 2013/0188068 A1 | 7/2013 | Said | |
| 2013/0215108 A1 | 8/2013 | McMahon et al. | |
| 2013/0215226 A1 | 8/2013 | Chauvier et al. | |
| 2013/0222656 A1 | 8/2013 | Kaneko | |
| 2013/0234935 A1 | 9/2013 | Griffith | |
| 2013/0242137 A1 | 9/2013 | Kirkland | |
| 2013/0258451 A1 | 10/2013 | Ei-Ghoroury et al. | |
| 2013/0262511 A1 | 10/2013 | Kuffner et al. | |
| 2013/0286236 A1 | 10/2013 | Mankowski | |
| 2013/0321574 A1 | 12/2013 | Zhang et al. | |
| 2013/0321581 A1 | 12/2013 | El-Ghoroury | |
| 2013/0321677 A1 | 12/2013 | Cote et al. | |
| 2013/0329107 A1 | 12/2013 | Burley et al. | |
| 2013/0329132 A1 | 12/2013 | Tico et al. | |
| 2013/0335596 A1 | 12/2013 | Demandoix et al. | |
| 2013/0335598 A1* | 12/2013 | Gustavsson | H04N 5/2351 348/234 |
| 2013/0342700 A1 | 12/2013 | Kass | |
| 2014/0002502 A1 | 1/2014 | Han | |
| 2014/0002699 A1 | 1/2014 | Guan | |
| 2014/0003719 A1 | 1/2014 | Bai et al. | |
| 2014/0013273 A1 | 1/2014 | Ng | |
| 2014/0035959 A1 | 2/2014 | Lapstun | |
| 2014/0037280 A1 | 2/2014 | Shirakawa | |
| 2014/0049663 A1 | 2/2014 | Ng et al. | |
| 2014/0059462 A1 | 2/2014 | Wernersson | |
| 2014/0085282 A1 | 3/2014 | Luebke et al. | |
| 2014/0092424 A1 | 4/2014 | Grosz | |
| 2014/0098191 A1 | 4/2014 | Rime et al. | |
| 2014/0132741 A1 | 5/2014 | Aagaard et al. | |
| 2014/0133749 A1 | 5/2014 | Kuo et al. | |
| 2014/0139538 A1 | 5/2014 | Barber et al. | |
| 2014/0167196 A1 | 6/2014 | Heimgartner et al. | |
| 2014/0176540 A1 | 6/2014 | Tosio et al. | |
| 2014/0176592 A1 | 6/2014 | Wilburn et al. | |
| 2014/0176710 A1 | 6/2014 | Brady | |
| 2014/0177905 A1 | 6/2014 | Grefalda | |
| 2014/0184885 A1 | 7/2014 | Tanaka et al. | |
| 2014/0192208 A1 | 7/2014 | Okincha | |
| 2014/0193047 A1 | 7/2014 | Grosz | |
| 2014/0195921 A1 | 7/2014 | Grosz | |
| 2014/0204111 A1 | 7/2014 | Vaidyanathan et al. | |
| 2014/0211077 A1 | 7/2014 | Ng et al. | |
| 2014/0218540 A1 | 8/2014 | Geiss et al. | |
| 2014/0226038 A1 | 8/2014 | Kimura | |
| 2014/0240463 A1 | 8/2014 | Pitts et al. | |
| 2014/0240578 A1 | 8/2014 | Fishman et al. | |
| 2014/0267243 A1 | 9/2014 | Venkataraman et al. | |
| 2014/0267633 A1* | 9/2014 | Venkataraman | G01P 3/38 348/48 |
| 2014/0267639 A1 | 9/2014 | Tatsuta | |
| 2014/0286566 A1* | 9/2014 | Rhoads | G06T 3/4038 382/154 |
| 2014/0300753 A1 | 10/2014 | Yin | |

(56) References Cited

U.S. PATENT DOCUMENTS

| | | | |
|---|---|---|---|
| 2014/0313350 A1 | 10/2014 | Keelan | |
| 2014/0313375 A1 | 10/2014 | Milnar | |
| 2014/0340390 A1 | 11/2014 | Lanman et al. | |
| 2014/0347540 A1 | 11/2014 | Kang | |
| 2014/0354863 A1 | 12/2014 | Ahn et al. | |
| 2014/0368494 A1 | 12/2014 | Sakharnykh et al. | |
| 2014/0368640 A1 | 12/2014 | Strandemar et al. | |
| 2015/0062178 A1 | 3/2015 | Matas et al. | |
| 2015/0062386 A1 | 3/2015 | Sugawara | |
| 2015/0092071 A1 | 4/2015 | Meng et al. | |
| 2015/0097985 A1 | 4/2015 | Akeley | |
| 2015/0163406 A1* | 6/2015 | Laroia | G02B 27/58 348/208.1 |
| 2015/0193937 A1 | 7/2015 | Georgiev et al. | |
| 2015/0206340 A1 | 7/2015 | Munkberg et al. | |
| 2015/0207990 A1 | 7/2015 | Ford et al. | |
| 2015/0237273 A1 | 8/2015 | Sawadaishi | |
| 2015/0104101 A1 | 10/2015 | Bryant et al. | |
| 2015/0310592 A1 | 10/2015 | Kano | |
| 2015/0312553 A1 | 10/2015 | Ng et al. | |
| 2015/0312593 A1 | 10/2015 | Akeley et al. | |
| 2015/0370011 A1 | 12/2015 | Ishihara | |
| 2015/0370012 A1 | 12/2015 | Ishihara | |
| 2016/0029017 A1 | 1/2016 | Liang | |
| 2016/0050372 A1 | 2/2016 | Lindner et al. | |
| 2016/0142615 A1 | 5/2016 | Liang | |
| 2016/0155215 A1 | 6/2016 | Suzuki | |
| 2016/0165206 A1 | 6/2016 | Huang et al. | |
| 2016/0173844 A1 | 6/2016 | Knight et al. | |
| 2016/0191823 A1 | 6/2016 | El-Ghoroury | |
| 2016/0253837 A1 | 9/2016 | Zhu et al. | |
| 2016/0269620 A1 | 9/2016 | Romanenko et al. | |
| 2016/0307368 A1 | 10/2016 | Akeley | |
| 2016/0307372 A1 | 10/2016 | Pitts et al. | |
| 2016/0309065 A1 | 10/2016 | Karafin et al. | |
| 2016/0353026 A1 | 12/2016 | Blonde et al. | |
| 2016/0379374 A1* | 12/2016 | Sokeila | G06T 5/003 348/43 |
| 2016/0381348 A1 | 12/2016 | Hayasaka | |
| 2017/0059305 A1 | 3/2017 | Nonn et al. | |
| 2017/0067832 A1 | 3/2017 | Ferrara, Jr. et al. | |
| 2017/0094906 A1 | 3/2017 | Liang et al. | |
| 2017/0134639 A1* | 5/2017 | Pitts | H04N 5/23212 |
| 2017/0139131 A1 | 5/2017 | Karafin et al. | |
| 2017/0180699 A1* | 6/2017 | El Choubassi | H04N 13/128 |
| 2017/0237971 A1 | 8/2017 | Pitts et al. | |
| 2017/0243373 A1 | 8/2017 | Bevensee et al. | |
| 2017/0244948 A1 | 8/2017 | Pang et al. | |
| 2017/0256036 A1 | 9/2017 | Song et al. | |
| 2017/0263012 A1 | 9/2017 | Sabater et al. | |
| 2017/0302903 A1 | 10/2017 | Ng et al. | |
| 2017/0324950 A1* | 11/2017 | Du | H04N 5/2254 |
| 2017/0358092 A1* | 12/2017 | Bleibel | G06T 7/194 |
| 2017/0365068 A1 | 12/2017 | Tan et al. | |
| 2017/0366804 A1* | 12/2017 | Du | H04N 5/23212 |
| 2018/0012397 A1 | 1/2018 | Carothers | |
| 2018/0020204 A1 | 1/2018 | Pang et al. | |
| 2018/0033209 A1 | 2/2018 | Akeley et al. | |
| 2018/0034134 A1 | 2/2018 | Pang et al. | |
| 2018/0070066 A1 | 3/2018 | Knight et al. | |
| 2018/0070067 A1 | 3/2018 | Knight et al. | |
| 2018/0082405 A1 | 3/2018 | Liang | |
| 2018/0089903 A1 | 3/2018 | Pang et al. | |
| 2018/0097867 A1 | 4/2018 | Pang et al. | |
| 2018/0158198 A1 | 6/2018 | Kamad | |
| 2018/0249073 A1* | 8/2018 | Kim | H04N 5/23229 |

FOREIGN PATENT DOCUMENTS

| | | |
|---|---|---|
| DE | 19624421 | 1/1997 |
| JP | 2010020100 | 1/2010 |
| JP | 2011135170 | 7/2011 |
| WO | 2003052465 | 6/2003 |
| WO | 2006039486 | 4/2006 |
| WO | 2007092545 | 8/2007 |
| WO | 2007092581 | 8/2007 |
| WO | 2011010234 | 3/2011 |
| WO | 2011029209 | 3/2011 |
| WO | 2011081187 | 7/2011 |

OTHER PUBLICATIONS

Liu et al, "Video Stabilization with a Depth Camera" ,IEEE, pp. 89-95 (Year: 2012).*

Lowe, David, "Distinctive Image Features fro Scale-Invariant Keypoints", International Journal of Computer Vision 60(2), 91-110, 2004 (Year: 2004).*

Nimeroff, J., et al., "Efficient rendering of naturally illuminatied environments" in Fifth Eurographics Workshop on Rendering, 359-373, 1994.

Nokia, "City Lens", May 2012.

Ogden, J., "Pyramid-Based Computer Graphics", 1985.

Okano et al., "Three-dimensional video system based on integral photography" Optical Engineering, Jun. 1999. vol. 38, No. 6, pp. 1072-1077.

Orzan, Alexandrina, et al., "Diffusion Curves: A Vector Representation for Smooth-Shaded Images," ACM Transactions on Graphics—Proceedings of SIGGRAPH 2008; vol. 27; 2008.

Pain, B., "Back-Side Illumination Technology for SOI-CMOS Image Sensors", 2009.

Perez, Patrick et al., "Poisson Image Editing," ACM Transactions on Graphics—Proceedings of ACM SIGGRAPH 2003; vol. 22, Issue 3; Jul. 2003; pp. 313-318.

Petschnigg, George, et al., "Digial Photography with Flash and No-Flash Image Pairs", SIGGRAPH 2004.

Primesense, "The Primesense 3D Awareness Sensor", 2007.

Ramamoorthi, R., et al, "Frequency space environment map rendering" ACM Transactions on Graphics (SIGGRAPH 2002 proceedings) 21, 3, 517-526.

Ramamoorthi, R., et al., "An efficient representation for irradiance environment maps", in Proceedings of SIGGRAPH 2001, 497-500.

Raskar, Ramesh et al., "Glare Aware Photography: 4D Ray Sampling for Reducing Glare Effects of Camera Lenses," ACM Transactions on Graphics—Proceedings of ACM SIGGRAPH, Aug. 2008; vol. 27, Issue 3; pp. 1-10.

Raskar, Ramesh et al., "Non-photorealistic Camera: Depth Edge Detection and Stylized Rendering using Multi-Flash Imaging", SIGGRAPH 2004.

Raytrix, "Raytrix Lightfield Camera," Raytrix GmbH, Germany 2012, pp. 1-35.

Roper Scientific, Germany "Fiber Optics," 2012.

Scharstein, Daniel, et al., "High-Accuracy Stereo Depth Maps Using Structured Light," CVPR'03 Proceedings of the 2003 IEEE Computer Society, pp. 195-202.

Schirmacher, H. et al., "High-Quality Interactive Lumigraph Rendering Through Warping," May 2000, Graphics Interface 2000.

Shade, Jonathan, et al., "Layered Depth Images", SIGGRAPH 98, pp. 1-2.

Shreiner, OpenGL Programming Guide, 7th edition, Chapter 8, 2010.

Simpleviewer, "Tiltview", http://simpleviewer.net/tiltviewer. Retrieved Jan. 2013.

Skodras, A. et al., "The JPEG 2000 Still Image Compression Standard," Sep. 2001, IEEE Signal Processing Magazine, pp. 36-58.

Sloan, P., et al., "Precomputed radiance transfer for real-time rendering in dynamic, low-frequency lighting environments", ACM Transactions on Graphics 21, 3, 527-536, 2002.

Snavely, Noah, et al., "Photo-tourism: Exploring Photo collections in 3D", ACM Transactions on Graphics (SIGGRAPH Proceedings), 2006.

Sokolov, "Autostereoscopy and Integral Photography by Professor Lippmann's Method" , 1911, pp. 23-29.

Sony Corp, "Interchangeable Lens Digital Camera Handbook", 2011.

Sony, Sony's First Curved Sensor Photo: http://www.engadget.com; Jul. 2014.

(56) References Cited

OTHER PUBLICATIONS

Stensvold, M., "Hybrid AF: A New Approach to Autofocus is Emerging for both Still and Video", Digital Photo Magazine, Nov. 13, 2012.
Story, D., "The Future of Photography", Optics Electronics, Oct. 2008.
Sun, Jian, et al., "Stereo Matching Using Belief Propagation", 2002.
Tagging photos on Flickr, Facebook and other online photo sharing sites (see, for example, http://support.gnip.com/customer/portal/articles/809309-flickr-geo-photos-tag-search). Retrieved Jan. 2013.
Takahashi, Keita, et al., "All in-focus View Synthesis from Under-Sampled Light Fields", ICAT 2003, Tokyo, Japan.
Tanida et al., "Thin observation module by bound optics (TOMBO): concept and experimental verification" Applied Optics 40, 11 (Apr. 10, 2001), pp. 1806-1813.
Tao, Michael, et al., "Depth from Combining Defocus and Correspondence Using Light-Field Cameras", Dec. 2013.
Techcrunch, "Coolinis", Retrieved Jan. 2013.
Teo, P., et al., "Efficient linear rendering for interactive light design", Tech. Rep. STAN-CS-TN-97-60, 1998, Stanford University.
Teranishi, N. "Evolution of Optical Structure in Images Sensors," Electron Devices Meeting (IEDM) 2012 IEEE International; Dec. 10-13, 2012.
Vaish et al., "Using plane + parallax for calibrating dense camera arrays", In Proceedings CVPR 2004, pp. 2-9.
Vaish, V., et al., "Synthetic Aperture Focusing Using a Shear-Warp Factorization of the Viewing Transform," Workshop on Advanced 3D Imaging for Safety and Security (in conjunction with CVPR 2005), 2005.
VR Playhouse, "The Surrogate," http://www.vrplayhouse.com/the-surrogate.
Wanner, S. et al., "Globally Consistent Depth Labeling of 4D Light Fields," IEEE Conference on Computer Vision and Pattern Recognition, 2012.
Wanner, S. et al., "Variational Light Field Analysis for Disparity Estimation and Super-Resolution," IEEE Transacations on Pattern Analysis and Machine Intellegence, 2013.
Wenger, et al, "Performance Relighting and Reflectance Transformation with Time-Multiplexed Illumination", Institute for Creative Technologies, SIGGRAPH 2005.
Wetzstein, Gordon, et al., "Sensor Saturation in Fourier Multiplexed Imaging", IEEE Conference on Computer Vision and Pattern Recognition (2010).
Wikipedia—Adaptive Optics: http://en.wikipedia.org/wiki/adaptive_optics. Retrieved Feb. 2014.
Wikipedia—Autofocus systems and methods: http://en.wikipedia.org/wiki/Autofocus. Retrieved Jan. 2013.
Wikipedia—Bayer Filter: http:/en.wikipedia.org/wiki/Bayer_filter. Retrieved Jun. 20, 2013.
Wikipedia—Color Image Pipeline: http://en.wikipedia.org/wiki/color_image_pipeline. Retrieved Jan. 15, 2014.
Wikipedia—Compression standard JPEG XR: http://en.wikipedia.org/wiki/JPEG_XR. Retrieved Jan. 2013.
Wikipedia—CYGM Filter: http://en.wikipedia.org/wiki/CYGM_filter. Retrieved Jun. 20, 2013.
International Search Report and Written Opinion dated Dec. 4, 2018 for corresponding International Application No. PCT/US2018/050402, 14 pages.
U.S. Appl. No. 15/967,076, filed Apr. 30, 2018 listing Jiantao Kuang et al. as inventors, entitled "Automatic Lens Flare Detection and Correction for Light-Field Images".
U.S. Appl. No. 15/666,298, filed Aug. 1, 2017 listing Yonggang Ha et al. as inventors, entitled "Focal Reducer With Controlled Optical Properties for Interchangeable Lens Light-Field Camera".
U.S. Appl. No. 15/590,808, filed May 9, 2017 listing Alex Song et al. as inventors, entitled "Adaptive Control for Immersive Experience Delivery".
U.S. Appl. No. 15/864,938, filed Jan. 8, 2018 listing Jon Karafin et al. as inventors, entitled "Motion Blur or Light-Field Images".
U.S. Appl. No. 15/590,841, filed May 9, 2017 listing Kurt Akeley et al. as inventors, entitled "Vantage Generation and Interactive Playback".
U.S. Appl. No. 15/590,951, filed May 9, 2017 listing Alex Song et al. as inventors, entitled "Wedge-Based Light-Field Video Capture".
U.S. Appl. No. 15/944,551, filed Apr. 3, 2018 listing Zejing Wang et al. as inventors, entitled "Generating Dolly Zoom Effect Using Light Field Image Data".
U.S. Appl. No. 15/874,723, filed Jan. 18, 2018 listing Mark Weir et al. as inventors, entitled "Multl-Camera Navigation Interface".
U.S. Appl. No. 15/897,994, filed Feb. 15, 2018 listing Trevor Carothers et al. as inventors, entitled "Generation of Virtual Reality With 6 Degrees of Freesom From Limited Viewer Ata".
U.S. Appl. No. 15/605,037, filed May 25, 2017 listing Zejing Wang et al. as inventors, entitled "Multl-View Back-Projection to a Light-Field".
U.S. Appl. No. 15/897,836, filed Feb. 15, 2018 listing Francois Bleibel et al. as inventors, entitled "Multi-View Contour Tracking".
U.S. Appl. No. 15/897,942, filed Feb. 15, 2018 listing Francois Bleibel et al. as inventors, entitled "Multi-View Contour Tracking With Grabcut".
Adelsberger, R. et al., "Spatially Adaptive Photographic Flash," ETH Zurich, Department of Computer Science, Technical Report 612, 2008, pp. 1-12.
Adelson et al., "Single Lens Stereo with a Plenoptic Camera" IEEE Translation on Pattern Analysis and Machine Intelligence, Feb. 1992. vol. 14, No. 2, pp. 99-106.
Adelson, E. H., and Bergen, J. R. 1991. The plenoptic function and the elements of early vision. In Computational Models of Visual Processing, edited by Michael S. Landy and J. Anthony Movshon. Cambridge, Mass.: mit Press.
Adobe Systems Inc, "XMP Specification", Sep. 2005.
Adobe, "Photoshop CS6 / in depth: Digital Negative (DNG)", http://www.adobe.com/products/photoshop/extend.displayTab2html. Retrieved Jan. 2013.
Agarwala, A., et al., "Interactive Digital Photomontage," ACM Transactions on Graphics, Proceedings of SIGGRAPH 2004, vol. 32, No. 3, 2004.
Andreas Observatory, Spectrograph Manual: IV. Flat-Field Correction, Jul. 2006.
Apple, "Apple iPad: Photo Features on the iPad", Retrieved Jan. 2013.
Bae, S., et al., "Defocus Magnification", Computer Graphics Forum, vol. 26, Issue 3 (Proc. of Eurographics 2007), pp. 1-9.
Belhumeur, Peter et al., "The Bas-Relief Ambiguity", International Journal of Computer Vision, 1997, pp. 1060-1066.
Belhumeur, Peter, et al., "The Bas-Relief Ambiguity", International Journal of Computer Vision, 1999, pp. 33-44, revised version.
Bhat, P. et al. "GradientShop: A Gradient-Domain Optimization Framework for Image and Video Filtering," SIGGRAPH 2010; 14 pages.
Bolles, R., et al., "Epipolar-Plane Image Analysis: An Approach to Determining Structure from Motion", International Journal of Computer Vision, 1, 7-55 (1987).
Bourke, Paul, "Image filtering in the Frequency Domain," pp. 1-9, Jun. 1998.
Canon, Canon Speedlite wireless flash system, User manual for Model 550EX, Sep. 1998.
Chai, Jin-Xang et al., "Plenoptic Sampling", ACM SIGGRAPH 2000, Annual Conference Series, 2000, pp. 307-318.
Chen, S. et al., "A CMOS Image Sensor with On-Chip Image Compression Based on Predictive Boundary Adaptation and Memoryless QTD Algorithm," Very Large Scalee Integration (VLSI) Systems, IEEE Transactions, vol. 19, Issue 4; Apr. 2011.
Chen, W., et al., "Light Field mapping: Efficient representation and hardware rendering of surface light fields", ACM Transactions on Graphics 21, 3, 447-456, 2002.
Cohen, Noy et al., "Enhancing the performance of the light field microscope using wavefront coding," Optics Express, vol. 22, issue 20; 2014.
Daly, D., "Microlens Arrays" Retrieved Jan. 2013.
Debevec, et al, "A Lighting Reproduction Approach to Live-Action Compoisting" Proceedings SIGGRAPH 2002.

(56) References Cited

OTHER PUBLICATIONS

Debevec, P., et al., "Acquiring the reflectance field of a human face", SIGGRAPH 2000.
Debevec, P., et al., "Recovering high dynamic radiance maps from photographs", SIGGRAPH 1997, 369-378.
Design of the xBox menu. Retrieved Jan. 2013.
Digital Photography Review, "Sony Announce new RGBE CCD," Jul. 2003.
Dorsey, J., et al., "Design and simulation of opera light and projection effects", in Computer Graphics (Proceedings of SIGGRAPH 91), vol. 25, 41-50.
Dorsey, J., et al., "Interactive design of complex time dependent lighting", IEEE Computer Graphics and Applications 15, 2 (Mar. 1995), 26-36.
Dowski et al., "Wavefront coding: a modern method of achieving high performance and/or low cost imaging systems" SPIE Proceedings, vol. 3779, Jul. 1999, pp. 137-145.
Dowski, Jr. "Extended Depth of Field Through Wave-Front Coding," Applied Optics, vol. 34, No. 11, Apr. 10, 1995; pp. 1859-1866.
Duparre, J. et al., "Micro-Optical Artificial Compound Eyes," Institute of Physics Publishing, Apr. 2006.
Eisemann, Elmar, et al., "Flash Photography Enhancement via Intrinsic Relighting", SIGGRAPH 2004.
Fattal, Raanan, et al., "Multiscale Shape and Detail Enhancement from Multi-light Image Collections", SIGGRAPH 2007.
Fernando, Randima, "Depth of Field—A Survey of Techniques," GPU Gems. Boston, MA; Addison-Wesley, 2004.
Fitzpatrick, Brad, "Camlistore", Feb. 1, 2011.
Fujifilm, Super CCD EXR Sensor by Fujifilm, brochure reference No. EB-807E, 2008.
Georgiev, T. et al., "Reducing Plenoptic Camera Artifacts," Computer Graphics Forum, vol. 29, No. 6, pp. 1955-1968; 2010.
Georgiev, T., et al., "Spatio-Angular Resolution Tradeoff in Integral Photography," Proceedings of Eurographics Symposium on Rendering, 2006.
Georgiev, T., et al., "Suppersolution with Plenoptic 2.0 Cameras," Optical Society of America 2009; pp. 1-3.
Georgiev, T., et al., "Unified Frequency Domain Analysis of Lightfield Cameras" (2008).
Georgiev, T., et al., Plenoptic Camera 2.0 (2008).
Girod, B., "Mobile Visual Search", IEEE Signal Processing Magazine, Jul. 2011.
Gortler et al., "The lumigraph" SIGGRAPH 96, pp. 43-54.
Groen et al., "A Comparison of Different Focus Functions for Use in Autofocus Algorithms," Cytometry 6:81-91, 1985.
Haeberli, Paul "A Multifocus Method for Controlling Depth of Field" GRAPHICA Obscura, 1994, pp. 1-3.
Heide, F. et al., "High-Quality Computational Imaging Through Simple Lenses," ACM Transactions on Graphics, SIGGRAPH 2013; pp. 1-7.
Heidelberg Collaboratory for Image Processing, "Consistent Depth Estimation in a 4D Light Field," May 2013.
Hirigoyen, F., et al., "1.1 um Backside Imager vs. Frontside Image: an optics-dedicated FDTD approach", IEEE 2009 International Image Sensor Workshop.
Huang, Fu-Chung et al., "Eyeglasses-free Display: Towards Correcting Visual Aberrations with Computational Light Field Displays," ACM Transaction on Graphics, Aug. 2014, pp. 1-12.
Isaksen, A., et al., "Dynamically Reparameterized Light Fields," SIGGRAPH 2000, pp. 297-306.
Ives H., "Optical properties of a Lippman lenticulated sheet," J. Opt. Soc. Am. 21, 171 (1931).
Ives, H. "Parallax Panoramagrams Made with a Large Diameter Lens", Journal of the Optical Society of America; 1930.
Jackson et al., "Selection of a Convolution Function for Fourier Inversion Using Gridding" IEEE Transactions on Medical Imaging, Sep. 1991, vol. 10, No. 3, pp. 473-478.
Kautz, J., et al., "Fast arbitrary BRDF shading for low-frequency lighting using spherical harmonics", in Eurographic Rendering Workshop 2002, 291-296.
Koltun, et al., "Virtual Occluders: An Efficient Interediate PVS Representation", Rendering Techniques 2000: Proc. 11th Eurographics Workshop Rendering, pp. 59-70, Jun. 2000.
Kopf, J., et al., Deep Photo: Model-Based Photograph Enhancement and Viewing, SIGGRAPH Asia 2008.
Lehtinen, J., et al. "Matrix radiance transfer", in Symposium on Interactive 3D Graphics, 59-64, 2003.
Lesser, Michael, "Back-Side Illumination", 2009.
Levin, A., et al., "Image and Depth from a Conventional Camera with a Coded Aperture", SIGGRAPH 2007, pp. 1-9.
Levoy et al.,"Light Field Rendering" SIGGRAPH 96 Proceeding, 1996. pp. 31-42.
Levoy, "Light Fields and Computational Imaging" IEEE Computer Society, Aug. 2006, pp. 46-55.
Levoy, M. "Light Field Photography and Videography," Oct. 18, 2005.
Levoy, M. "Stanford Light Field Microscope Project," 2008; http://graphics.stanford.edu/projects/lfmicroscope/, 4 pages.
Levoy, M., "Autofocus: Contrast Detection", http://graphics.stanford.edu/courses/cs178/applets/autofocusPD.html, pp. 1-3, 2010.
Levoy, M.,"Autofocus: Phase Detection", http://graphics.stanford.edu/courses/cs178/applets/autofocusPD.html, pp. 1-3, 2010.
Levoy, M., et al., "Light Field Microscopy", ACM Transactions on Graphics, vol. 25, No. 3, Proceedings SIGGRAPH 2006.
Liang, Chia-Kai, et al., "Programmable Aperture Photography: Multiplexed Light Field Acquisition", ACM SIGGRAPH, 2008.
Lippmann, "Reversible Prints", Communication at the French Society of Physics, Journal of Physics, 7 , 4, Mar. 1908, pp. 821-825.
Lumsdaine et al., "Full Resolution Lightfield Rendering" Adobe Technical Report Jan. 2008, pp. 1-12.
Maeda, Y. et al., "A CMOS Image Sensor with Pseudorandom Pixel Placement for Clear Imaging," 2009 International Symposium on Intelligent Signal Processing and Communication Systems, Dec. 2009.
Magnor, M. et al., "Model-Aided Coding of Multi-Viewpoint Image Data," Proceedings IEEE Conference on Image Processing, ICIP-2000, Vancouver, Canada, Sep. 2000. https://graphics.tu-bs.de/static/people/magnor/publications/icip00.pdf.
Mallat, Stephane, "A Wavelet Tour of Signal Processing", Academic Press 1998.
Malzbender, et al., "Polynomial Texture Maps", Proceedings SIGGRAPH 2001.
Marshall, Richard J. et al., "Improving Depth Estimation from a Plenoptic Camera by Patterned Illumination," Proc. of SPIE, vol. 9528, 2015, pp. 1-6.
Masselus, Vincent, et al., "Relighting with 4D Incident Light Fields", SIGGRAPH 2003.
Meynants, G., et al., "Pixel Binning in CMOS Image Sensors," Frontiers in Electronic Imaging Conference, 2009.
Moreno-Noguer, F. et al., "Active Refocusing of Images and Videos," ACM Transactions on Graphics, Aug. 2007; pp. 1-9.
Munkberg, J. et al., "Layered Reconstruction for Defocus and Motion Blur" EGSR 2014, pp. 1-12.
Naemura et al., "3-D Computer Graphics based on Integral Photography" Optics Express, Feb. 12, 2001. vol. 8, No. 2, pp. 255-262.
Nakamura, J., "Image Sensors and Signal Processing for Digital Still Cameras" (Optical Science and Engineering), 2005.
National Instruments, "Anatomy of a Camera," pp. 1-5, Sep. 6, 2006.
Nayar, Shree, et al., "Shape from Focus", IEEE Transactions on Pattern Analysis and Machine Intelligence, vol. 16, No. 8, pp. 824-831, Aug. 1994.
Ng, R., et al. "Light Field Photography with a Hand-held Plenoptic Camera," Stanford Technical Report, CSTR 2005-2, 2005.
Ng, R., et al., "All-Frequency Shadows Using Non-linear Wavelet Lighting Approximation. ACM Transactions on Graphics," ACM Transactions on Graphics; Proceedings of SIGGRAPH 2003.
Ng, R., et al., "Triple Product Wavelet Integrals for All-Frequency Relighting", ACM Transactions on Graphics (Proceedings of SIGGRAPH 2004).
Ng, Yi-Ren, "Digital Light Field Photography," Doctoral Thesis, Standford University, Jun. 2006; 203 pages.

(56) References Cited

OTHER PUBLICATIONS

Ng., R., "Fourier Slice Photography," ACM Transactions on Graphics, Proceedings of SIGGRAPH 2005, vol. 24, No. 3, 2005, pp. 735-744.
Nguyen, Hubert. "Practical Post-Process Depth of Field." GPU Gems 3. Upper Saddle River, NJ: Addison-Wesley, 2008.
Wikipedia—Data overlay techniques for real-time visual feed. For example, heads-up displays: http://en.wikipedia.org/wiki/Head-up_display. Retrieved Jan. 2013.
Wikipedia—Exchangeable image file format: http://en.wikipedia.org/wiki/Exchangeable_image_file_format. Retrieved Jan. 2013.
Wikipedia—Expeed: http://en.wikipedia.org/wiki/EXPEED. Retrieved Jan. 15, 2014.
Wikipedia—Extensible Metadata Platform: http://en.wikipedia.org/wiki/Extensible_Metadata_Plafform. Retrieved Jan. 2013.
Wikipedia—Key framing for video animation: http://en.wikipedia.org/wiki/Key_frame. Retrieved Jan. 2013.
Wikipedia—Lazy loading of image data: http://en.wikipedia.org/wiki/Lazy_loading. Retrieved Jan. 2013.
Wikipedia—Methods of Variable Bitrate Encoding: http://en.wikipedia.org/wiki/Variable_bitrate#Methods_of_VBR_encoding. Retrieved Jan. 2013.
Wikipedia—Portable Network Graphics format: http://en.wikipedia.org/wiki/Portable_Network_Graphics. Retrieved Jan. 2013.
Wikipedia—Unsharp Mask Technique: https://en.wikipedia.org/wiki/Unsharp_masking. Retrieved May 3, 2016.
Wilburn et al., "High Performance Imaging using Large Camera Arrays", ACM Transactions on Graphics (TOG), vol. 24, Issue 3 (Jul. 2005), Proceedings of ACM SIGGRAPH 2005, pp. 765-776.
Wilburn, Bennett, et al., "High Speed Video Using a Dense Camera Array", 2004.
Wilburn, Bennett, et al., "The Light Field Video Camera", Proceedings of Media Processors 2002.
Williams, L. "Pyramidal Parametrics," Computer Graphic (1983).
Winnemoller, H., et al., "Light Waving: Estimating Light Positions From Photographs Alone", Eurographics 2005.
Wippermann, F. "Chirped Refractive Microlens Array," Dissertation 2007.
Wuu, S., et al., "A Manufacturable Back-Side Illumination Technology Using Bulk Si Substrate for Advanced CMOS Image Sensors", 2009 International Image Sensor Workshop, Bergen, Norway.
Wuu, S., et al., "BSI Technology with Bulk Si Wafer", 2009 International Image Sensor Workshop, Bergen, Norway.
Xiao, Z. et al., "Aliasing Detection and Reduction in Plenoptic Imaging," IEEE Conference on Computer Vision and Pattern Recognition; 2014.
Xu, Xin et al., "Robust Automatic Focus Algorithm for Low Contrast Images Using a New Contrast Measure," Sensors 2011; 14 pages.
Zheng, C. et al., "Parallax Photography: Creating 3D Cinematic Effects from Stills", Proceedings of Graphic Interface, 2009.
Zitnick, L. et al., "High-Quality Video View Interpolation Using a Layered Representation," Aug. 2004; ACM Transactions on Graphics (TOG), Proceedings of ACM SIGGRAPH 2004; vol. 23, Issue 3; pp. 600-608.
Zoberbier, M., et al., "Wafer Cameras—Novel Fabrication and Packaging Technologies", 2009 International Image Senor Workshop, Bergen, Norway, 5 pages.

* cited by examiner

4D CAMERA TRACKING AND OPTICAL STABILIZATION

CROSS-REFERENCE TO RELATED APPLICATIONS

The present application is related to U.S. patent application Ser. No. 13/688,026, for "Extended Depth of Field and Variable Center of Perspective in Light-Field Processing", filed Nov. 28, 2012, and issued on Aug. 19, 2014 as U.S. Pat. No. 8,811,769, the disclosure of which is incorporated herein by reference in its entirety.

The present application is related to U.S. patent application Ser. No. 13/774,971, for "Compensating for Variation in Microlens Position During Light-Field Image Processing", filed Feb. 22, 2013, and issued on Sep. 9, 2014 as U.S. Pat. No. 8,831,377, the disclosure of which is incorporated herein by reference in its entirety.

TECHNICAL FIELD

The present disclosure relates to digital imaging. More precisely, the present disclosure relates to use of light-field data to track the motion path of a camera and/or adjust the stability of image data generated by the camera.

BACKGROUND

In conventional 2D digital photography, an image of a scene may be captured as a 2D matrix of color values that represents the scene from one field of view. The focus depth and Center of Perspective (CoP) of the image typically cannot be changed after the image has been captured; rather, the focus depth and Center of Perspective at the time of image capture determine what features are in focus and in view. Accordingly, there is also no way to modify the viewpoint from which an image is taken.

One repercussion of this limitation is that it may be difficult to carry out image stabilization. Since true image stabilization would require adjustment of the viewpoint from which the image or video was captured, conventional 2D image stabilization methods are typically limited to lossy processes that can only compensate for 2D shifts within an image sequence. The need to crop portions of the image to correct the 2D shifts results in loss of image data.

SUMMARY

According to various embodiments, a light-field video stream may be processed to obtain a camera pathway indicative of the viewpoint from which a light-field video stream was generated (i.e., captured). The camera pathway may be modified to obtain an adjusted camera pathway, which may provide a more desirable viewpoint. For example, the adjusted camera pathway may be stabilized relative to the camera pathway to provide image stabilization. In the alternative, the adjusted camera pathway may be de-stabilized, or "littered," relative to the camera pathway to simulate vibration or other motion of the viewer's viewpoint.

The camera pathway may be obtained in various ways. According to one embodiment, a plurality of target pixels may be selected, in a plurality of key frames of the light-field video stream. The target pixels may have predetermined color and/or intensity characteristics that facilitate tracking of the target pixels between frames. For example, the target pixels may be selected from static, textured objects that appear in the key frames. The target pixels may further be from planar regions of the objects to further facilitate tracking.

According to some embodiments, the target pixels may be identified by generating a list of a plurality of targets appearing in each of the key frames, generating a plane model for each of the targets for each of the key frames, and then generating a mask for each of the targets for each of the key frames, indicating one or more target pixels within each of the targets. Further, superpixel segmentation may be carried out, and a motion error map may be calculated, for each of the key frames. The superpixels and motion error maps may be used to access texture and motion error for each of the superpixels for each key frame, to identify a plurality of the superpixels as candidate targets. A plane may be fitted to each of the candidate targets for each key frame. The targets may then be selected from among the candidate targets.

If desired, identification of the target pixels may be facilitated by using a depth map for each of the key frames, and/or initial camera motion, generated by a sensor operating contemporaneously with capture of the light-field video stream. The camera motion may be indicative of motion of the light-field camera during at least a segment, containing the key frames, of the light-field video stream. In some examples the camera motion may be for an initial segment of the light-field video stream, and may facilitate accurate identification and/or location of the targets.

The target pixels may be used to generate a camera pathway indicative of motion of the camera during generation of the light-field video stream. The camera pathway may have six degrees of freedom, and may encompass the entirety of the video stream. A 3D mapping of the target pixels may also be generated.

In some embodiments, the camera pathway may be generated by dividing the light-field video stream into a plurality of sequences, each of which begins with one of the key frames. For each segment, starting with the first segment, the position and/or orientation of the target pixels may be tracked in each frame, and changes in the positions and/or orientations may be compared between frames to obtain a portion of the camera pathway for that segment. The position and/or orientation of each of the target pixels in the last frame of a sequence may be used for the starting key frame of the next sequence.

If desired, generation of the camera pathway may be facilitated by using camera-intrinsic parameters obtained from calibration of the light-field camera, light-field optics parameters pertinent to one or more light-field optical elements of the light-field camera, and/or camera motion, generated by a sensor operating contemporaneously with capture of the light-field video stream. The camera motion may be indicative of motion of the light-field camera during at least a segment of the light-field video stream.

The camera pathway may be adjusted to generate an adjusted camera pathway. This may be done, for example, to carry out image stabilization. Image stabilization may be improved by adjusting U,V coordinates within each of a plurality of frames of the light-field video stream to cause frame-to-frame motion to be relatively smooth and contiguous The light-field video stream may be projected to a viewpoint defined by the adjusted camera pathway to generate a projected video stream with the image stabilization. The projected video stream may be outputted to an output device, such as a display screen.

These concepts will be described in greater detail below.

BRIEF DESCRIPTION OF THE DRAWINGS

The accompanying drawings illustrate several embodiments. Together with the description, they serve to explain the principles of the embodiments. One skilled in the art will recognize that the particular embodiments illustrated in the drawings are merely exemplary, and are not intended to limit scope.

DEFINITIONS

Figure 1:
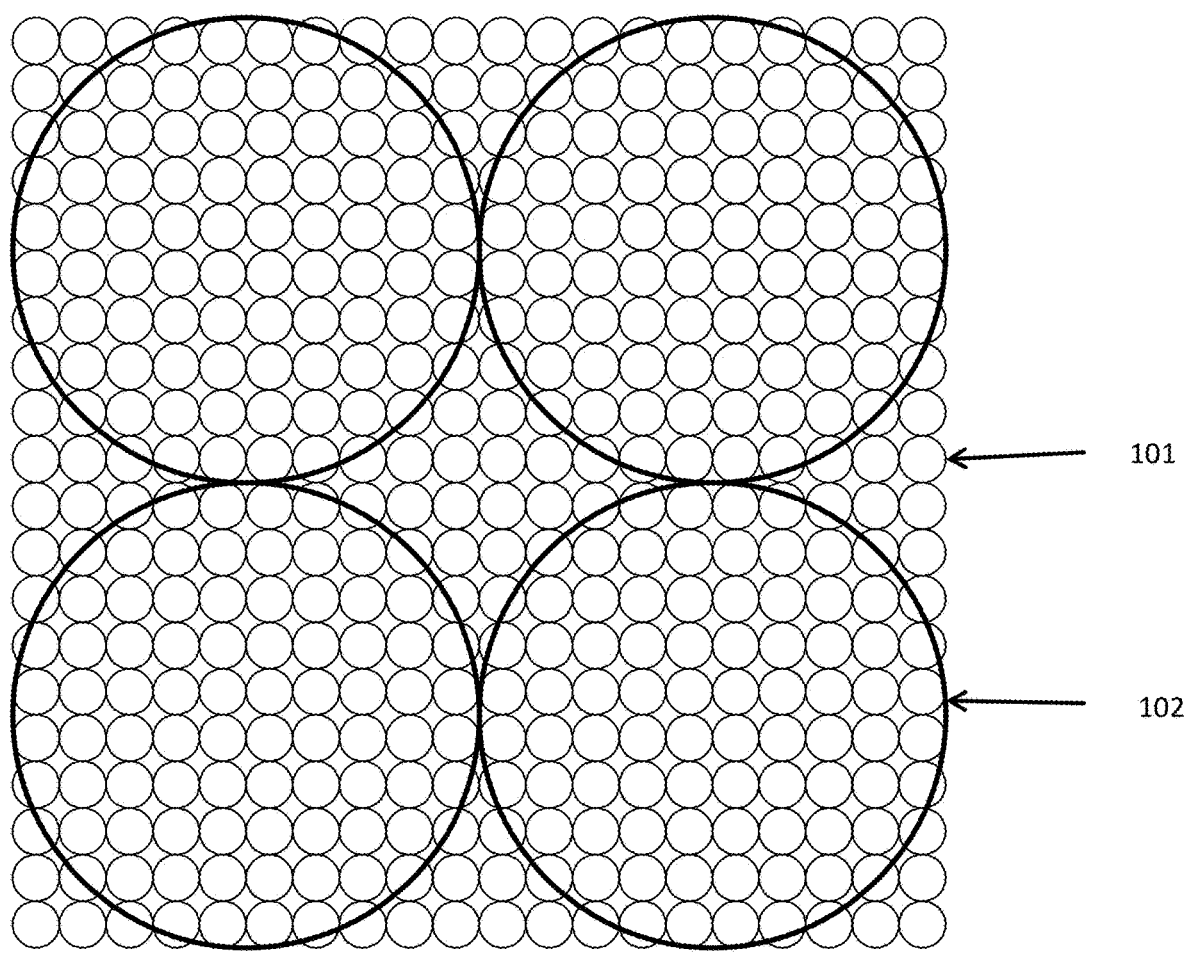
FIG. 1 depicts a portion of a light-field image.

For purposes of the description provided herein, the following definitions are used:

Adjusted camera pathway: a camera pathway that has been deliberately modified.
Camera pathway: a pathway indicative of motion of a camera
Conventional image: an image in which the pixel values are not, collectively or individually, indicative of the angle of incidence at which light is received by a camera.
Depth: a representation of distance between an object and/or corresponding image sample and a camera or camera element, such as the microlens array of a plenoptic light-field camera.
Disk: a region in a light-field image that is illuminated by light passing through a single microlens; may be circular or any other suitable shape.
Image: a two-dimensional array of pixel values, or pixels, each specifying a color.
Input device: any device that receives input from a user.
Light-field camera: any camera capable of capturing light-field images.
Light-field data: data indicative of the angle of incidence at which light is received by a camera.
Light-field image: an image that contains a representation of light-field data captured at the sensor.
Light-field video stream: a sequential arrangement of light-field data captured over a length of time, from which a video stream can be projected.
Main lens: a lens or set of lenses that directs light from a scene toward an image sensor.
Mask: a map representing whether a set of pixels possesses one or more attributes, such as the attributes needed to operate as a target pixel.
Microlens: a small lens, typically one in an array of similar microlenses.
Microlens array: an array of microlenses arranged in a predetermined pattern.
Output device: any device that provides output to a user.
Scene: a collection of one or more objects to be imaged and/or modeled.
Image sensor: a light detector in a camera capable of generating electrical signals based on light received by the sensor.
Subaperture view: an image generated from light-field data from the same location on each microlens of a microlens array or each camera image of a tiled camera array.
Superpixel segmentation: division of an image into groups (superpixels) of adjacent pixels.
Target: a portion of a light-field image, containing multiple pixels, including at least one target pixel.
Target pixel: a pixel of a target, with properties suitable for automated identification and/or modeling in 3D space.

In addition to the foregoing, additional terms will be set forth and defined in the description below. Terms not explicitly defined are to be interpreted, primarily, in a manner consistently with their usage and context herein, and, secondarily, in a manner consistent with their use in the art.

For ease of nomenclature, the term "camera" is used herein to refer to an image capture device or other data acquisition device. Such a data acquisition device can be any device or system for acquiring, recording, measuring, estimating, determining and/or computing data representative of a scene, including but not limited to two-dimensional image data, three-dimensional image data, and/or light-field data. Such a data acquisition device may include optics, sensors, and image processing electronics for acquiring data representative of a scene, using techniques that are well known in the art. One skilled in the art will recognize that many types of data acquisition devices can be used in connection with the present disclosure, and that the disclosure is not limited to cameras. Thus, the use of the term "camera" herein is intended to be illustrative and exemplary, but should not be considered to limit the scope of the disclosure. Specifically, any use of such term herein should be considered to refer to any suitable device for acquiring image data.

In the following description, several techniques and methods for processing light-field images are described. One skilled in the art will recognize that these various techniques and methods can be performed singly and/or in any suitable combination with one another. Further, many of the configurations and techniques described herein are applicable to conventional imaging as well as light-field imaging. Thus, although the following description focuses on light-field imaging, all of the following systems and methods may additionally or alternatively be used in connection with conventional digital imaging systems. In some cases, the needed modification is as simple as removing the microlens array from the configuration described for light-field imaging to convert the example into a configuration for conventional image capture.

Architecture

In at least one embodiment, the system and method described herein can be implemented in connection with light-field images captured by light-field capture devices including but not limited to those described in Ng et al., Light-field photography with a hand-held plenoptic capture device, Technical Report CSTR 2005-02, Stanford Computer Science. Further, any known depth sensing technology may be used.

Figure 2:
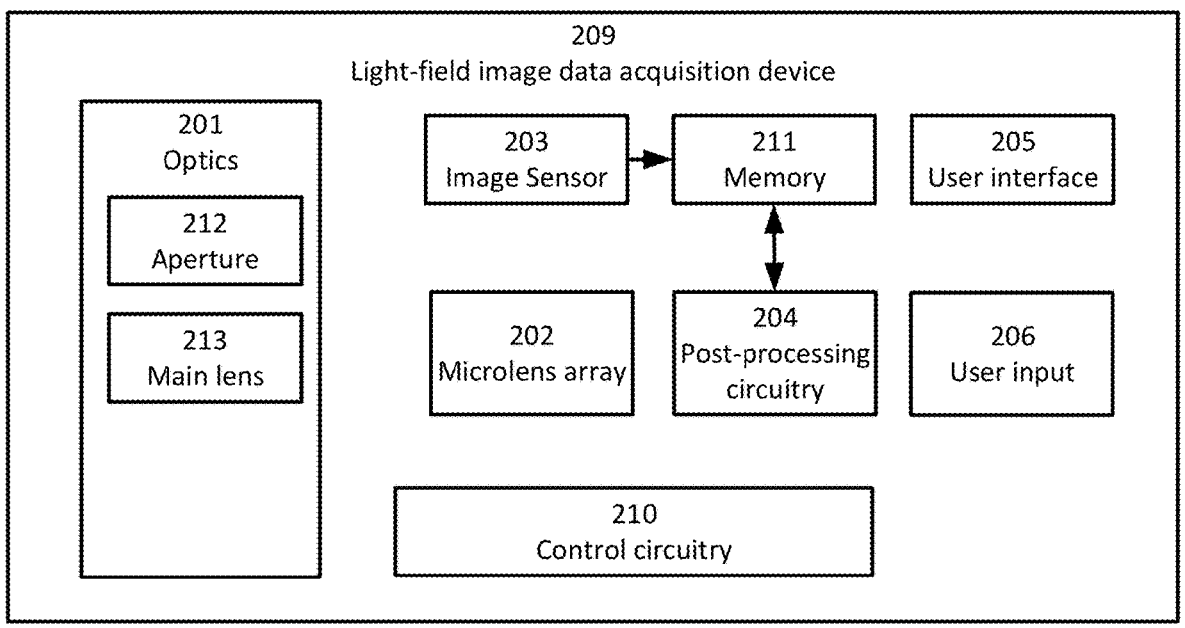
FIG. 2 depicts an example of an architecture for implementing the methods of the present disclosure in a light-field capture device, according to one embodiment.
Figure 3:
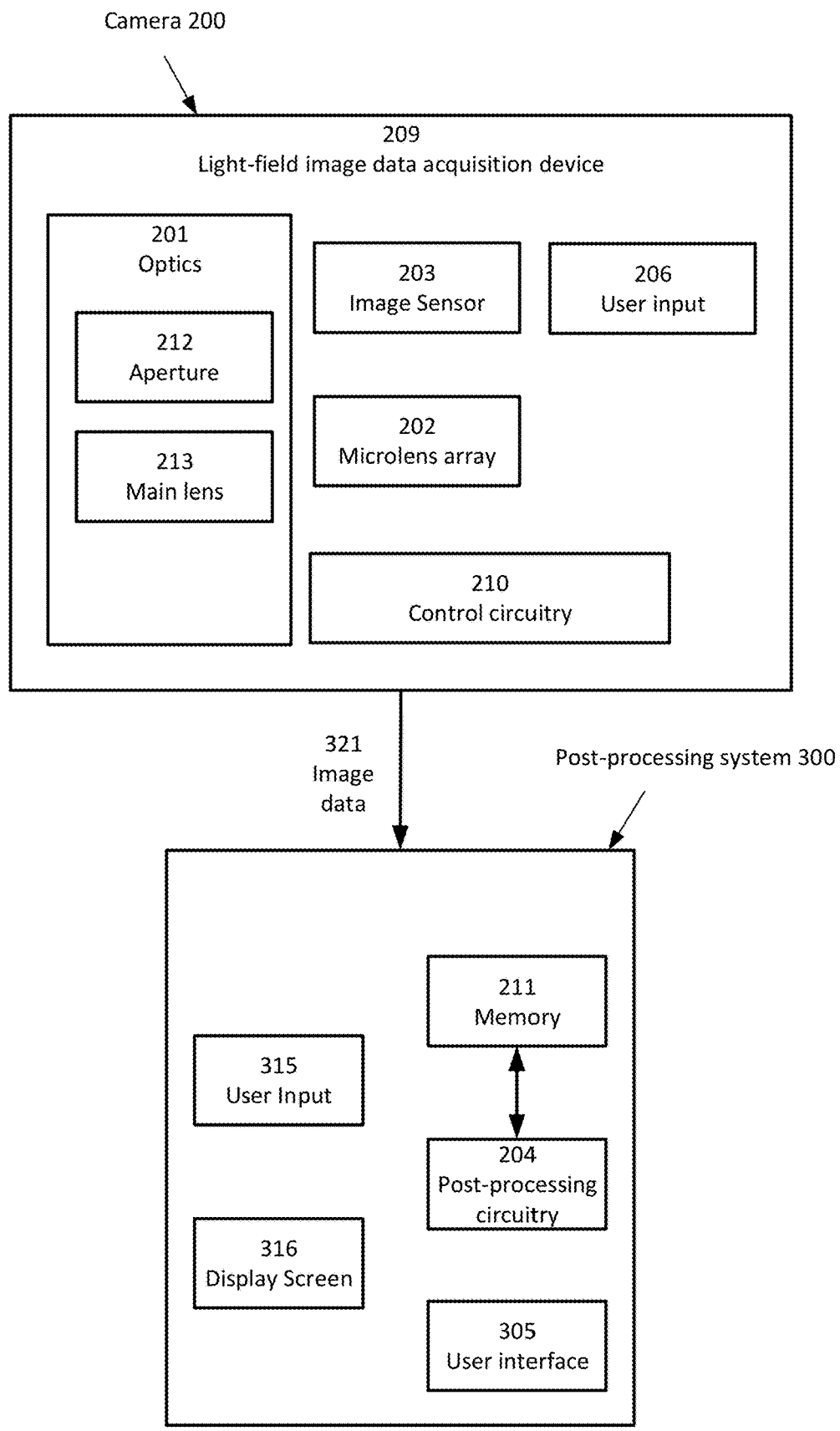
FIG. 3 depicts an example of an architecture for implementing the methods of the present disclosure in a post-processing system communicatively coupled to a light-field capture device, according to one embodiment.

Referring now to FIG. 2, there is shown a block diagram depicting an architecture for implementing the method of the present disclosure in a light-field capture device such as a camera 200. Referring now also to FIG. 3, there is shown a block diagram depicting an architecture for implementing the method of the present disclosure in a post-processing system 300 communicatively coupled to a light-field capture device such as a camera 200, according to one embodiment. One skilled in the art will recognize that the particular configurations shown in FIGS. 2 and 3 are merely exemplary, and that other architectures are possible for camera 200 and post-processing system 300. One skilled in the art will further recognize that several of the components shown in the configurations of FIGS. 2 and 3 are optional, and may be omitted or reconfigured.

In at least one embodiment, camera 200 may be a light-field camera that includes light-field image data acquisition device 209 having optics 201, image sensor 203 (including a plurality of individual sensors for capturing pixels), and microlens array 202. Optics 201 may include, for example, aperture 212 for allowing a selectable amount of light into camera 200, and main lens 213 for focusing light toward microlens array 202. In at least one embodiment, microlens array 202 may be disposed and/or incorporated in the optical path of camera 200 (between main lens 213 and image sensor 203) so as to facilitate acquisition, capture, sampling of, recording, and/or obtaining light-field image data via image sensor 203. The microlens array 203 may be positioned on or near a focal plane 204 of the main lens 213.

Figure 4:
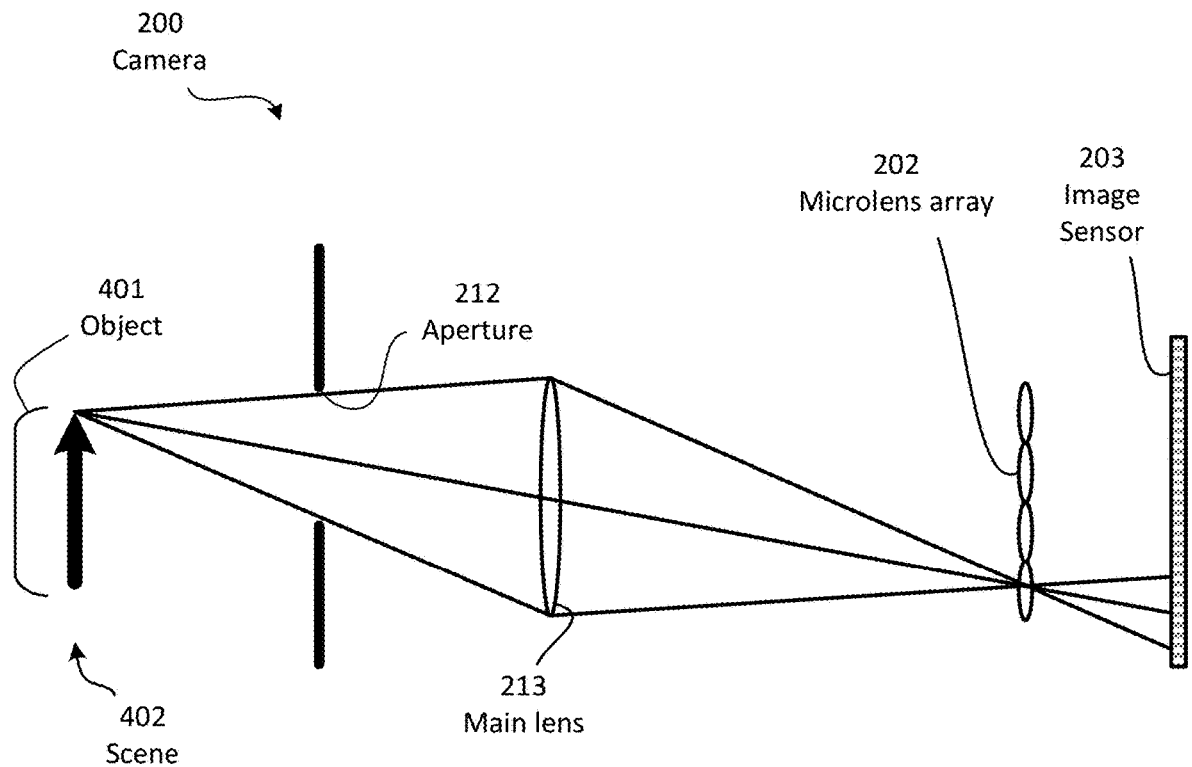
FIG. 4 depicts an example of an architecture for a light-field camera for implementing the methods of the present disclosure according to one embodiment.

Referring now also to FIG. 4, there is shown an example of an architecture for a light-field camera, or camera 200, for implementing the method of the present disclosure according to one embodiment. FIG. 4 is not shown to scale. FIG. 4 shows, in conceptual form, the relationship between aperture 212, main lens 213, microlens array 202, and image sensor 203, as such components interact to capture light-field data for one or more objects, represented by an object 401, which may be part of a scene 402.

In at least one embodiment, camera 200 may also include a user interface 205 for allowing a user to provide input for controlling the operation of camera 200 for capturing, acquiring, storing, and/or processing image data. The user interface 205 may receive user input from the user via an input device 206, which may include any one or more user input mechanisms known in the art. For example, the input device 206 may include one or more buttons, switches, touch screens, gesture interpretation devices, pointing devices, and/or the like.

Similarly, in at least one embodiment, post-processing system 300 may include a user interface 305 that allows the user to provide input to control parameters for post-processing, and/or for other functions.

In at least one embodiment, camera 200 may also include control circuitry 210 for facilitating acquisition, sampling, recording, and/or obtaining light-field image data. The control circuitry 210 may, in particular, be used to switch image capture configurations such as the zoom level, resolution level, focus, and/or aperture size in response to receipt of the corresponding user input. For example, control circuitry 210 may manage and/or control (automatically or in response to user input) the acquisition timing, rate of acquisition, sampling, capturing, recording, and/or obtaining of light-field image data.

In at least one embodiment, camera 200 may include memory 211 for storing image data, such as output by image sensor 203. Such memory 211 can include external and/or internal memory. In at least one embodiment, memory 211 can be provided at a separate device and/or location from camera 200.

In at least one embodiment, captured image data is provided to post-processing circuitry 204. The post-processing circuitry 204 may be disposed in or integrated into light-field image data acquisition device 209, as shown in FIG. 2, or it may be in a separate component external to light-field image data acquisition device 209, as shown in FIG. 3. Such separate component may be local or remote with respect to light-field image data acquisition device 209. Any suitable wired or wireless protocol may be used for transmitting image data 321 to circuitry 204; for example, the camera 200 can transmit image data 321 and/or other data via the Internet, a cellular data network, a Wi-Fi network, a Bluetooth communication protocol, and/or any other suitable means.

Such a separate component may include any of a wide variety of computing devices, including but not limited to computers, smartphones, tablets, cameras, and/or any other device that processes digital information. Such a separate component may include additional features such as a user input 315 and/or a display screen 316. If desired, light-field image data may be displayed for the user on the display screen 316.

Overview

Light-field images often include a plurality of projections (which may be circular or of other shapes) of aperture 212 of camera 200, each projection taken from a different vantage point on the camera's focal plane. The light-field image may be captured on image sensor 203. The interposition of microlens array 202 between main lens 213 and image sensor 203 causes images of aperture 212 to be formed on image sensor 203, each microlens in microlens array 202 projecting a small image of main-lens aperture 212 onto image sensor 203. These aperture-shaped projections are referred to herein as disks, although they need not be circular in shape. The term "disk" is not intended to be limited to a circular region, but can refer to a region of any shape.

Light-field images include four dimensions of information describing light rays impinging on the focal plane of camera 200 (or other capture device). Two spatial dimensions (herein referred to as x and y) are represented by the disks themselves. For example, the spatial resolution of a light-field image with 120,000 disks, arranged in a Cartesian pattern 400 wide and 300 high, is 400×300. Two angular dimensions (herein referred to as u and v) are represented as the pixels within an individual disk. For example, the angular resolution of a light-field image with 100 pixels within each disk, arranged as a 10×10 Cartesian pattern, is 10×10. This light-field image has a 4-D (x,y,u,v) resolution of (400,300,10,10). Referring now to FIG. 1, there is shown an example of a 2-disk by 2-disk portion of such a light-field image, including depictions of disks 102 and individual pixels 101; for illustrative purposes, each disk 102 is ten pixels 101 across.

In at least one embodiment, the 4-D light-field representation may be reduced to a 2-D image through a process of projection and reconstruction. As described in more detail in related U.S. Utility application Ser. No. 13/774,971 for "Compensating for Variation in Microlens Position During Light-Field Image Processing," filed Feb. 22, 2013, the disclosure of which is incorporated herein by reference in its entirety, a virtual surface of projection may be introduced, and the intersections of representative rays with the virtual surface can be computed. The color of each representative ray may be taken to be equal to the color of its corresponding pixel.

Camera Pathway Generation and Adjustment

There are many instances in which it is desirable to obtain the 3D pathway followed by a camera to capture a scene. For example, in order to integrate computer-generated objects or effects in a scene, it may be desirable to render the computer-generated elements with a virtual camera that remains aligned with the actual camera used to capture the scene. Further, integration of the scene with audio effects may be done with reference to the camera pathway. For example, the volume and/or speaker position of audio effects may be determined based on the camera position and/or orientation in any given frame.

It may be most helpful to obtain a camera pathway with six degrees of freedom (for example, three to specify camera position along each of three orthogonal axes, and three to specify the orientation of the camera about each axis) for each frame. In this application, "camera pathway" includes the position and/or orientation of the camera.

In addition to the uses mentioned above, obtaining the camera pathway may enable the camera pathway to be adjusted for various purposes. Light-field image capture provides the unique ability to reproject images at different Centers of Perspective, allowing the viewpoint of the camera to effectively be shifted. Further details regarding projection of light-field data may be found in U.S. Utility application Ser. No. 13/688,026, for "Extended Depth of Field and Variable Center of Perspective in Light-Field Processing", filed Nov. 28, 2012, the disclosure of which is incorporated herein by reference in its entirety.

In some embodiments, the camera pathway may be adjusted to smooth out the camera pathway, thereby effectively stabilizing the camera. Such stabilization may not have the losses and limitations inherent in known image stabilization algorithms used for conventional 2D images. As another alternative, jitter may be added to the camera pathway, causing the reprojected view to shake. This may be used to simulate an explosion, impact, earthquake, or the like, after image capture.

Figure 5:
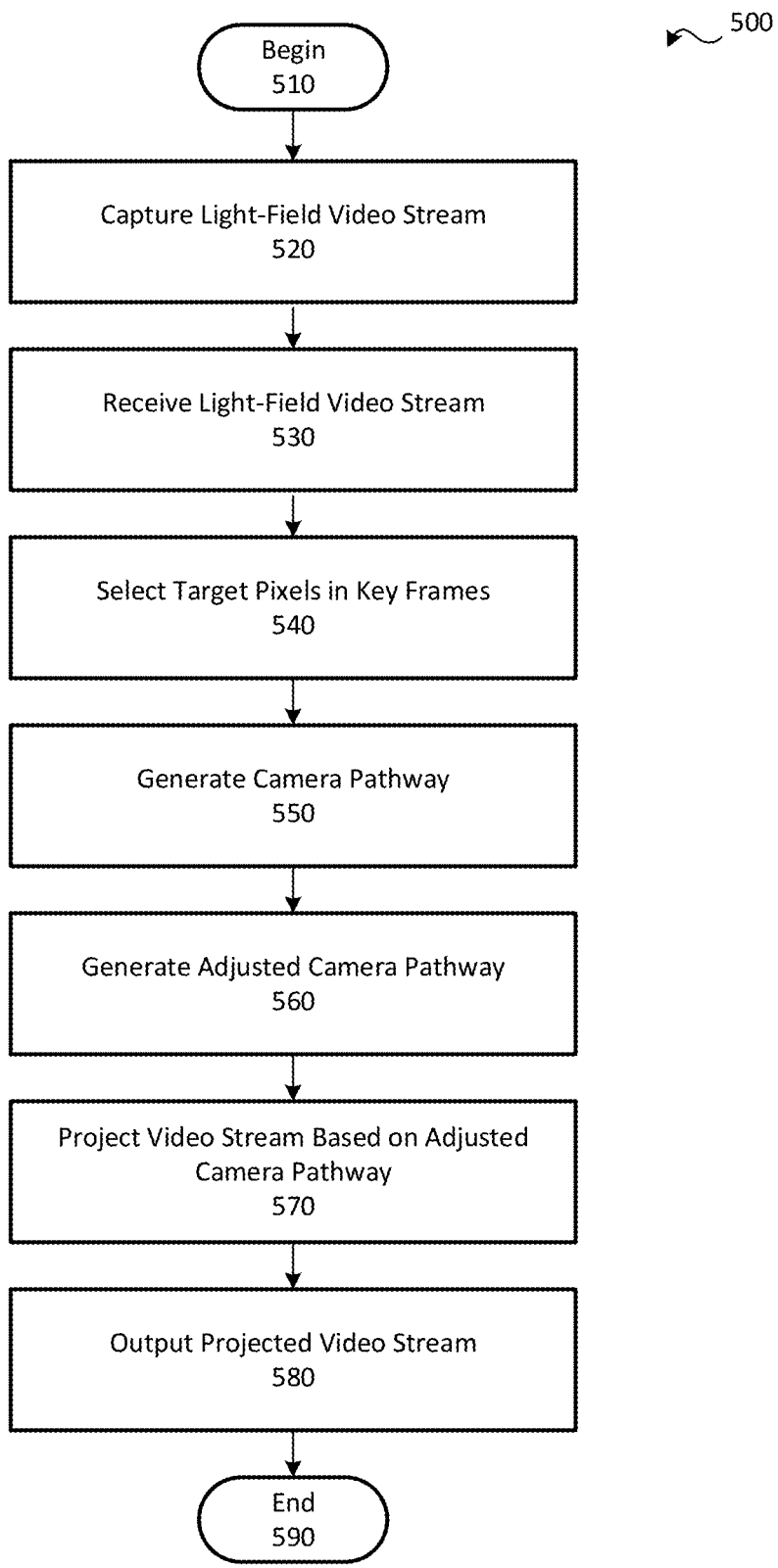
FIG. 5 is a flow diagram depicting a method for carrying out image stabilization, according to one embodiment.

FIG. 5 is a flow diagram depicting a method 500 for generating and adjusting a camera pathway to carry out image stabilization or other adjustments, according to one embodiment. The method 500 may be used in conjunction with light-field data captured by one or more plenoptic light-field cameras such as the light-field camera 200 of FIG. 2. Additionally or alternatively, the light-field data may be captured through the use of a different camera system, such as a tiled camera array that captures light-field data without the use of a microlens array.

The method 500 may start 510 with a step 520 in which the light-field video stream is captured. This may be done by a light-field camera such as the light-field camera 200 of FIG. 2, or by a different type of light-field image capture system, as mentioned previously. The light-field video stream may be the image data 321 referenced in FIG. 3.

In a step 530, the light-field video stream may be received, for example, at a processor capable of processing the light-field video stream. The processor may be the post-processing circuitry 204 of the camera 200, as in FIG. 2, and/or the post-processing circuitry 204 of the post-processing system 300, as in FIG. 3. In the alternative, any processor capable of processing light-field data may receive the light-field video stream.

In a step 540, target pixels may be selected in key frames of the light-field video stream. Target pixels may be pixels with color/intensity characteristics that make them easy to automatically recognize, and hence track from one frame to another. The target pixels may be identified, at least, in key frames of the light-field video stream. The step 540 will be described in greater detail in connection with FIG. 6.

In a step 550, a camera pathway may be generated, indicative of motion of the light-field camera used to generate (i.e., capture) the light-field video stream. If some information about the camera pathway is already available at the commencement of the step 550, the step 550 may include gathering the remaining data needed to generate the camera pathway with six degrees of freedom, for the entire length of the light-field video stream. The step 550 will be described in greater detail in connection with FIG. 11.

In a step 560, an adjusted camera pathway may be generated, based on the camera pathway. The adjusted camera pathway may include any desired adjustments, such as camera stabilization or camera jittering. This step is optional; as mentioned previously, the camera pathway may be useful independently of the creation of an adjusted camera pathway. For example, integration of computer-generated elements in the light-field video stream may not require the adjustment of the camera pathway, but may rather be based on the un-adjusted camera pathway.

In a step 570, a video stream may be projected based on the adjusted camera pathway. The video stream may be projected from the viewpoint of the camera, in each frame, as indicated on the adjusted camera pathway. The adjusted camera pathway may also provide the position and orientation of the camera with six degrees of freedom, and may thus provide the information needed to generate new projected views. The video stream generated in the step 570 may thus reflect the modifications made to the camera pathway, such as image stabilization. This step is optional, and may be unnecessary if the step 560 is not carried out.

In a step 580, the video stream generated in the step 570 may be output to an output device. This may be, for example, the display screen 316 of the post-processing system 300 of FIG. 3. Additionally or alternatively, the video stream may be output to any other suitable output device, such as a monitor or other display screen that is not part of a light-field data processing system. This step is also optional, and may not be needed if the step 560 and the step 570 are not performed. The method 500 may then end 590.

Various steps of the method 500 of FIG. 5 may be re-ordered, iterated, and/or altered in various ways. Further, various steps of the method 500 may be omitted, replaced with alternative steps, or supplemented with additional steps not specifically shown and described herein. Such modifications would be understood by a person of skill in the art, with the aid of the present disclosure.

Target and Target Pixel Identification

Figure 6:
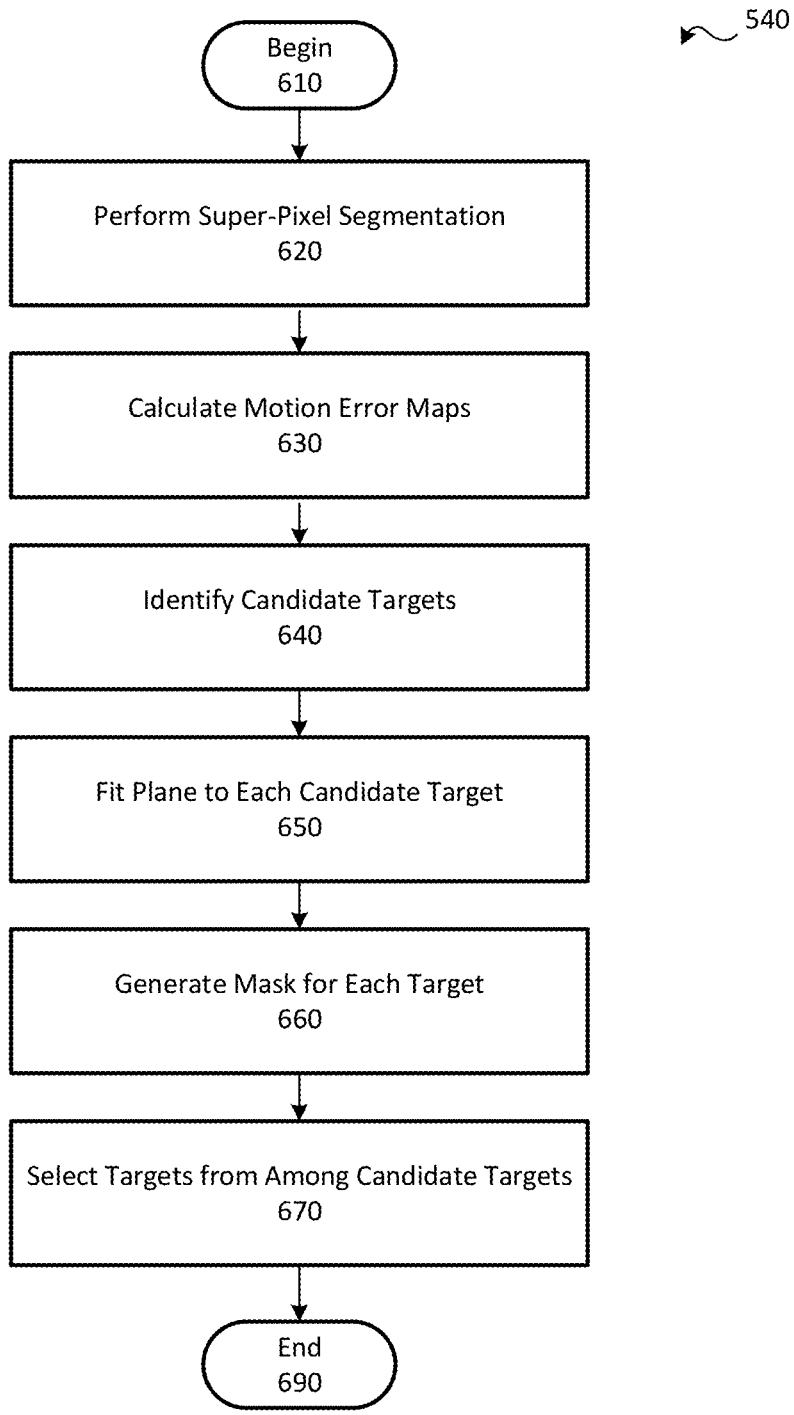
FIG. 6 is a flow diagram depicting the step of selecting the target pixels from the method of FIG. 5, in greater detail, according to one embodiment.

FIG. 6 is a flow diagram depicting the step 540 of selecting the target pixels from the method of FIG. 5, in greater detail, according to one embodiment. The step 540 will be described with reference to FIGS. 7 through 10. The step 540 may utilize one or more of the following, which may be included in the light-field video stream and/or provided separately:

Designation of at least two key frames (for example, a first key frame and a second key frame) in the light-field video. This designation may be made by a user, or automatically by the system. In some embodiments, the key frames may be arbitrarily selected.

Depth maps for each of the key frames. The depth maps may be obtained by processing the light-field video stream and/or from one or more depth sensors, such as LiDAR or time-of-flight sensors, that captured depth data synchronously with capture of the light-field video stream.

Initial camera motion for a sequence of frames that contains the first and second key frames. The initial camera motion need not apply to the entire light-field video stream, but may rather be applicable to only a portion, such as the initial frames of the light-field video stream. In some embodiments, the initial camera motion may be obtained from data captured by other sensors, such as LiDAR sensors, gyroscopes, accelerometers, or other sensors that measure depth, position, orientation, velocity, and/or acceleration. Synchronous location and mapping (SLAM) techniques or the like may be applied to such sensor data to obtain the initial camera motion.

The step 540 may be designed to provide output, which may include one or more of the following:

A list of targets, each of which is defined in at least the first frame by a closed contour. The closed contour may be a list of targets, for example, designating each target by (x, y) coordinates.

A plane model of each target, for example, providing the position and orientation of a plane passing through the target. The plane model may designate the plane, for example, by a normal vector n and an offset d.

A mask for each of the targets for each key frame, indicating one or more target pixels within each of the targets. The target pixels may be the pixels within each target that are suitable for matching in different frames.

The step 540 may utilize direct image mapping to determine the camera pose and motion, and the depth of objects in the scene. The targets used for direct image mapping may be selected to facilitate identification and matching between frames. Thus, each of the targets may have color and/or intensity characteristics that facilitate identification. The targets may advantageously be static, so that relative motion of the targets between frames can be used to ascertain motion of the camera (as opposed to motion of the targets). Further, the targets may have textures that make them relatively easy to identify with accuracy.

Further, in at least one embodiment, only planar regions (i.e., planar surfaces of objects) may be selected as targets. This may facilitate usage of planes to approximate the targets, and may minimize the number of unknowns in the expressions used to solve for depth. Specifically, for a planar region, only four unknowns need to be solved for.

As shown, the step 540 may begin 610 with a step 620 in which superpixel segmentation of each key frame is carried out. Superpixel segmentation may entail division of each key frame into groups (superpixels) in which pixels have some traits in common, such as color and/or intensity values.

Figure 7:
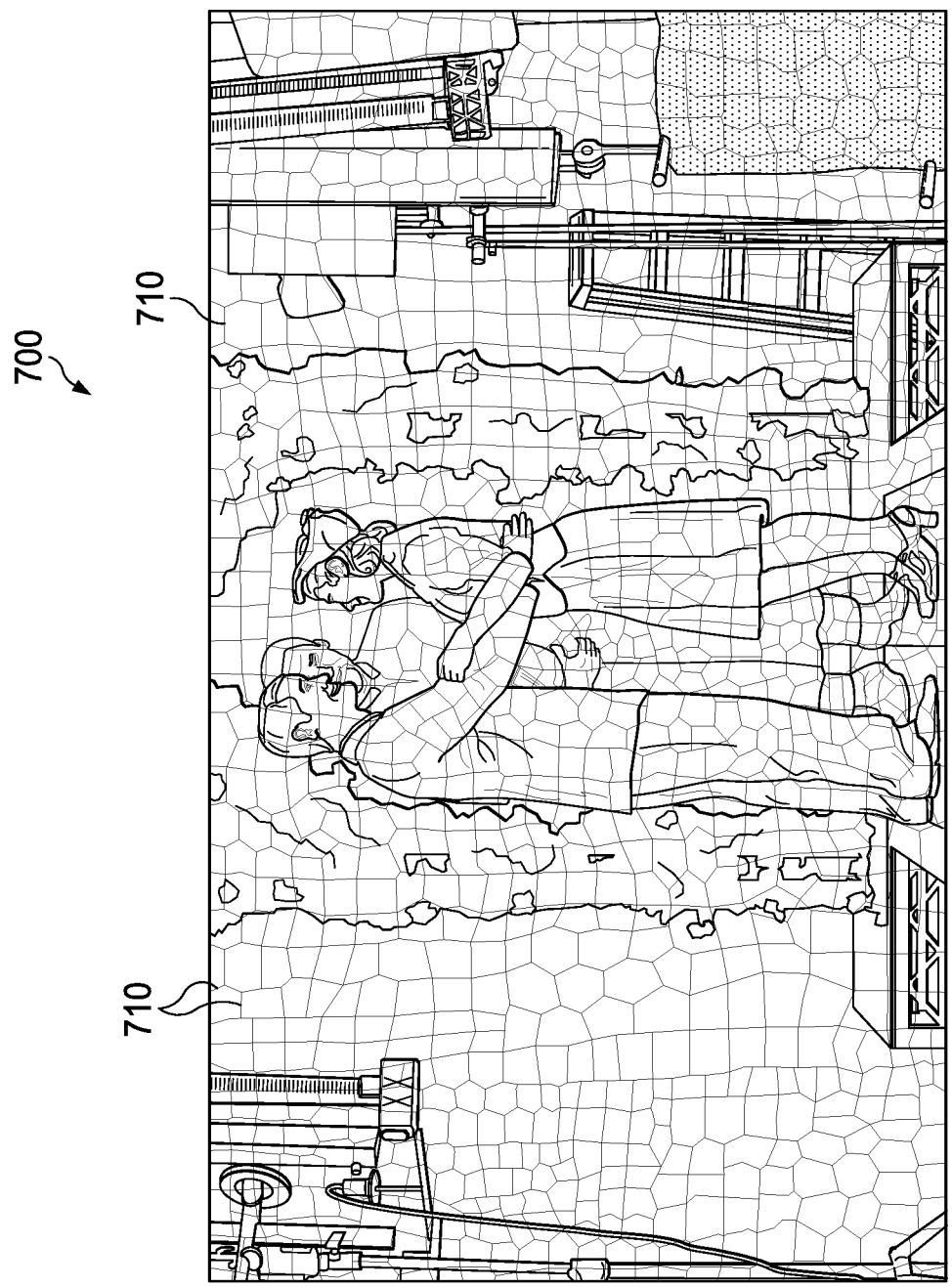
FIG. 7 is a screenshot depicting superpixel segmentation of a frame, according to one embodiment.

FIG. 7 is a screenshot depicting superpixel segmentation of a frame 700, according to one embodiment. The frame 700 may be divided into superpixels 710, as shown. The superpixels 710 may be of a generally, but not precisely, uniform size and shape. Any of a variety of superpixel segmentation algorithms known in the art may be used. In some embodiments, superpixel segmentation may be carried out via Simple Linear Iterative Clustering (SLIC) or a similar method.

Returning to FIG. 6, in a step 630, a motion error map may be calculated for each of the key frames. The motion error map may be a grayscale representation of relative motion between frames (for example consecutive frames). The motion error map may reveal which elements of the scene are moving between the frames, and which are stationary.

Figure 8:
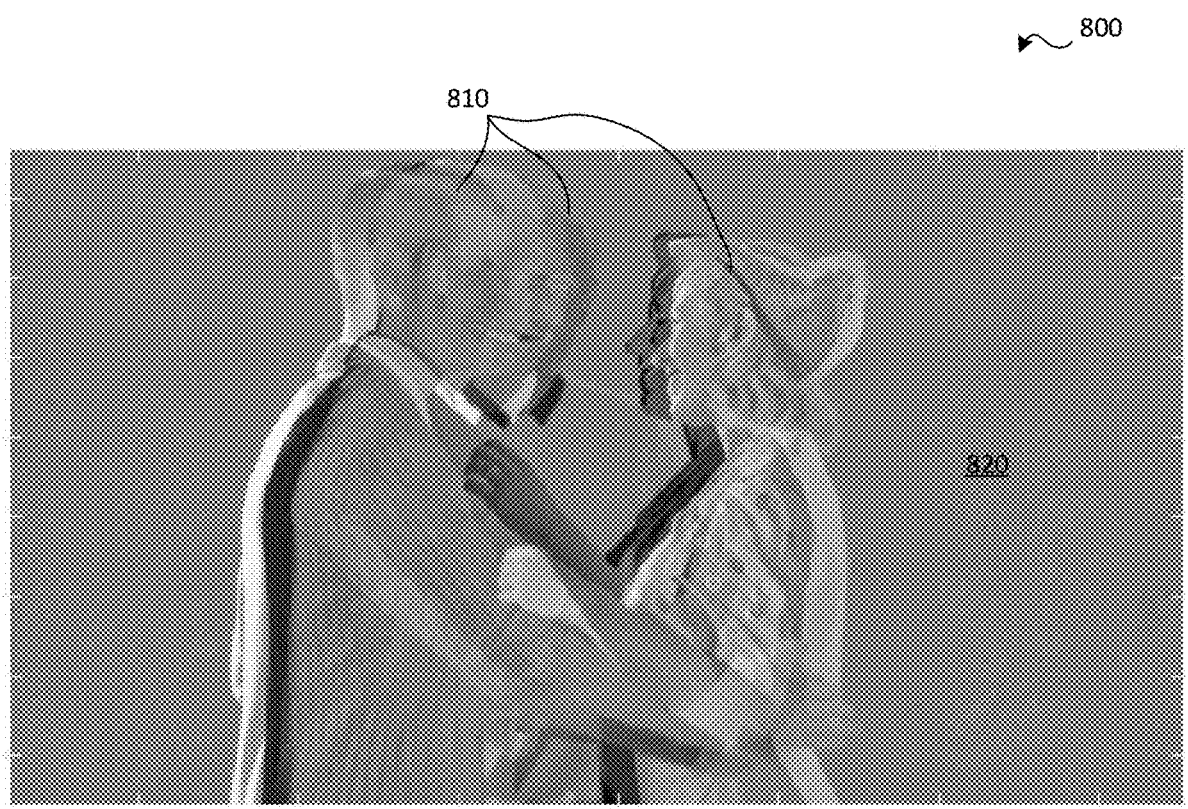
FIG. 8 is a screenshot depicting a motion error map for the frame of FIG. 7, according to one embodiment.

FIG. 8 is a screenshot depicting a motion error map 800 for the frame 700 of FIG. 7, according to one embodiment. As shown, the motion error map 800 indicates that the people 810 in the foreground are moving, while the background elements 820 are stationary.

Returning to FIG. 6, in a step 640, candidate targets may be identified from among the superpixels 710 of the frame 700. This may be done by using the superpixels delineated in the step 620 and the motion error maps generated in the step 630. Candidate targets may be superpixels with small motion error (static) and strong gradient (texture). In some embodiments, only superpixels 710 with easily-recognizable textures, in which little or no motion between frames has occurred, may be designated as candidate targets.

Figure 9:
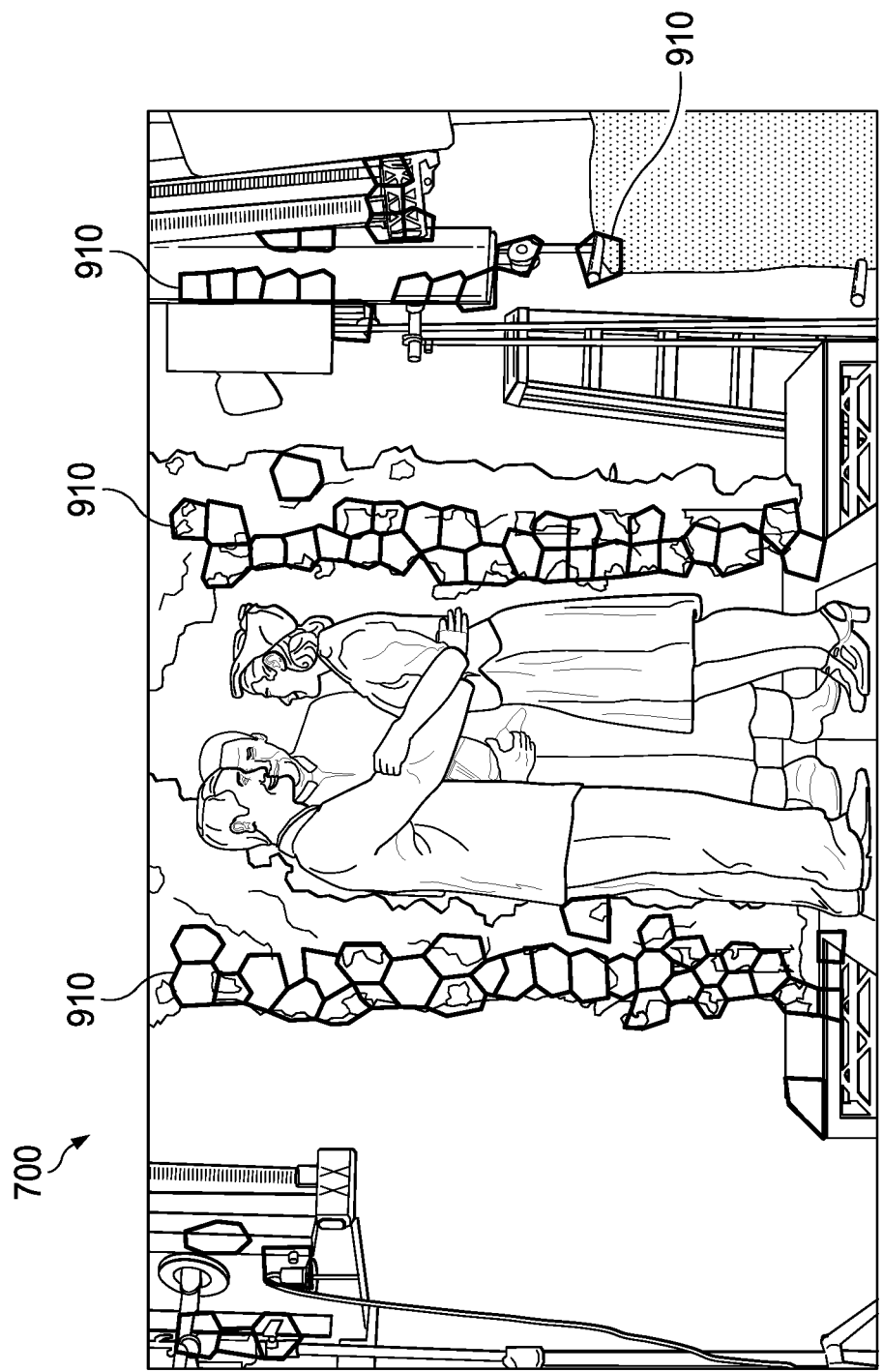
FIG. 9 is a screenshot depicting identification of candidate targets with texture and small motion error, in the frame of FIG. 7, according to one embodiment.

FIG. 9 is a screenshot depicting identification of candidate targets 910 with texture and small motion error, in the frame 700 of FIG. 7, according to one embodiment. As shown, some of the superpixels 710 of FIG. 7 have been identified as candidate targets 910. Notably, superpixels 710 lacking in texture (such as those of the blank wall behind the people 810) have not been selected, and moving elements (such as the people 810) also have not been selected. Rather, the candidate targets 910 are portions that are generally stationary and are textured enough to be readily recognized.

Returning to FIG. 6, in a step 650, planes may be fitted to the candidate targets 910. Thus, each of the candidate targets 910 may be approximated or modeled as a portion of a plane. The depth information mentioned earlier, which may be obtained by processing the light-field video stream and/or from another source, such as a depth sensor, may be used in the fitting of planes to the candidate targets 910.

In a step 660, a mask may be generated for each of the candidate targets 910, indicating which pixels within the candidate target 910 are suitable for use as target pixels. Target pixels may be those with the desired color/intensity characteristics for accurate recognition between frames.

In a step 670, some of the candidate targets may be selected as targets. This selection may be made, for example, based on whether each of the candidate targets 910 was readily and accurately mapped to a plane in the step 650, and/or whether each of the candidate targets 910 contains suitable target pixels, as determined in the step 660. The step 540 may then end 690.

Figure 10:
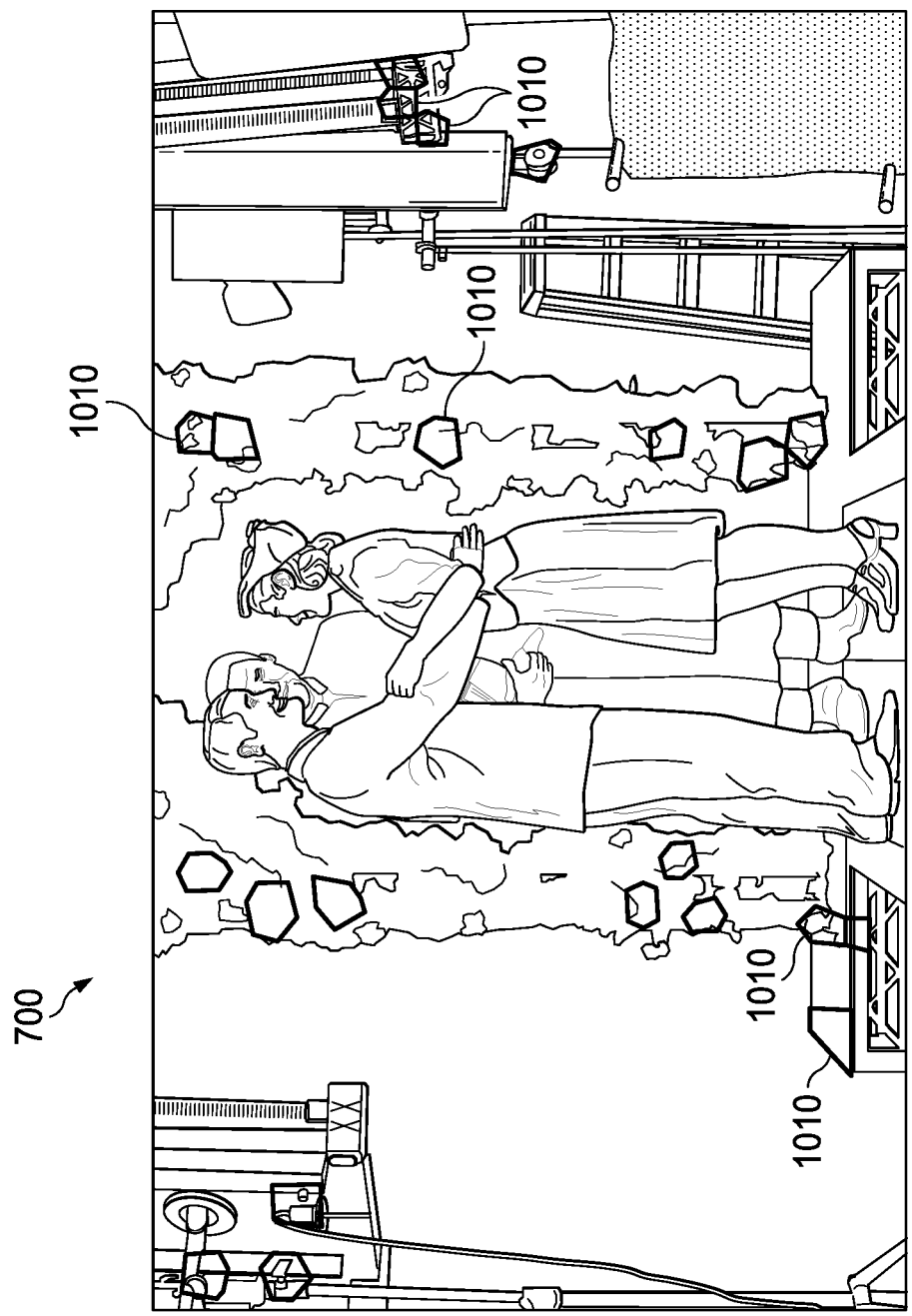
FIG. 10 is a screenshot depicting selection of targets in the frame of FIG. 7, according to one embodiment.

FIG. 10 is a screenshot depicting selection of targets 1010 in the frame 700 of FIG. 7, according to one embodiment. As described above, the targets 1010 may be the candidate targets 910 that are readily approximated with planes and contain suitable target pixels.

Camera Pathway Generation from Targets

Figure 11:
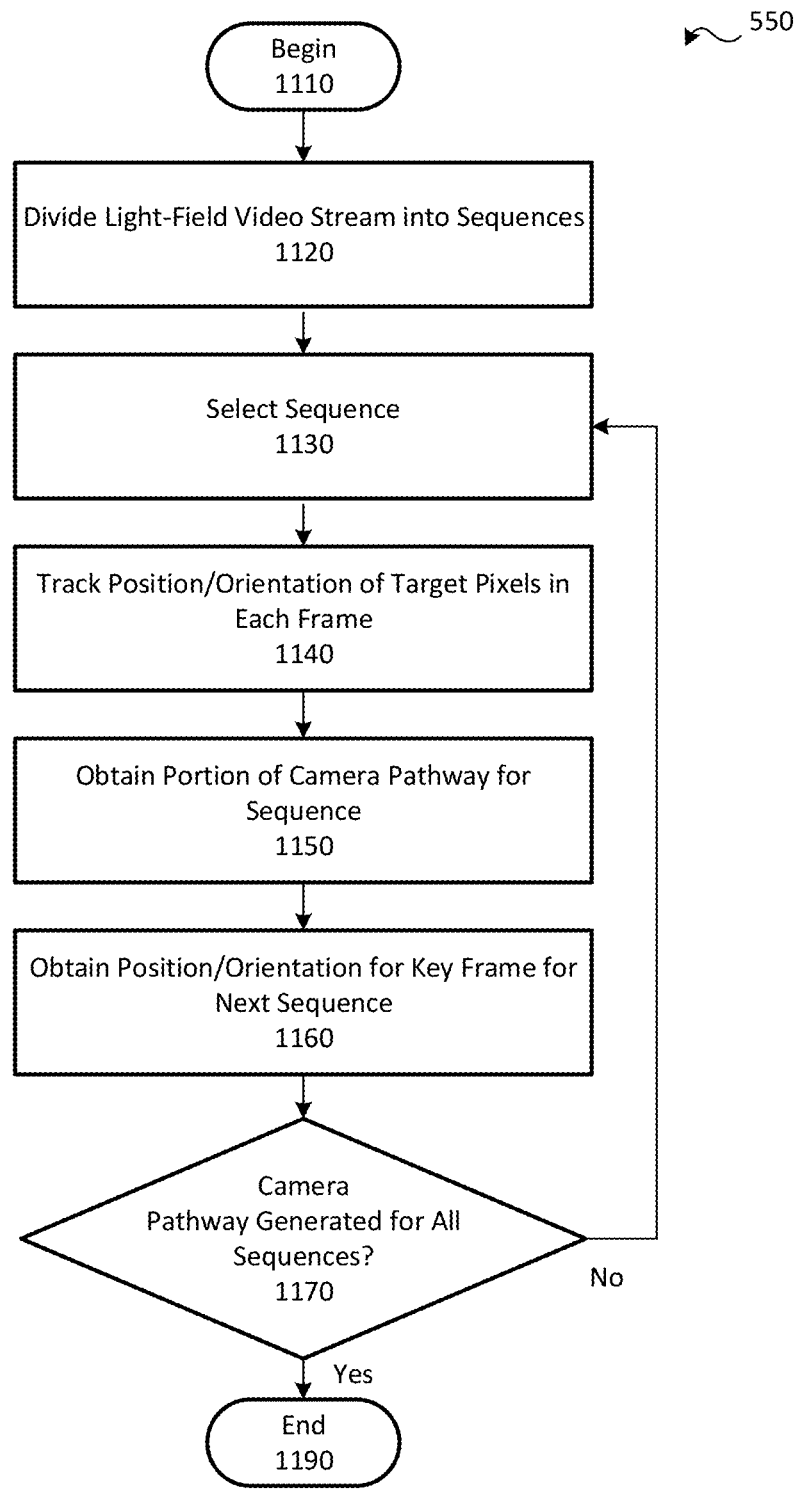
FIG. 11 is a flow diagram depicting the step of generating the camera pathway from the method of FIG. 5, according to one embodiment.

FIG. 11 is a flow diagram depicting the step 550 of generating the camera pathway from the method 500 of FIG. 5, according to one embodiment. The step 550 may utilize one or more of the following, which may be included in the light-field video stream and/or provided separately:

Depth maps for at least the key frames of the light-field video stream. As described above, the depth maps may be obtained by processing the light-field video stream and/or from one or more depth sensors.

Subaperture views for at least the key frames of the light-field video stream. For a plenoptic light-field camera, such as the camera 200, a subaperture view is an image generated from light-field data from the same location on each microlens of a microlens array, such as the microlens array 202. For a tiled camera array, a subaperture view is an image generated from light-field data from the same location on the image captured by each of the cameras of the tiled array. Subaperture views may be readily obtained for any frame of the light-field video stream by processing the light-field video stream, itself.

Camera-intrinsic parameters obtained from calibration of the light-field camera. Camera-intrinsic parameters may be unique to the light-field camera used to capture the light-field video stream.

Light-field optics parameters pertinent to one or more light-field optical elements of the light-field camera used to capture the light-field video stream. For example, the light-field optics parameters may include the distance between the microlens array 202 and the main lens 213, and the distance between the microlens array 202 and the image sensor 203.

Camera motion for at least a portion of the light-field video stream. The camera motion need not apply to the entire light-field video stream, but may rather be applicable to only a portion. In some embodiments, the camera motion may be obtained from data captured by other sensors. SLAM techniques or the like may be applied to such sensor data to obtain the camera motion.

The targets and target pixels identified in the step 540. These may, if desired, be supplemented with targets and/or target pixels selected by a user through the use of an input device, such as the user input 206 of the camera 200 of FIG. 2 or the user input 315 of the post-processing system 300 of FIG. 3.

The step 550 may be designed to provide output, which may include one or more of the following:

The camera pathway for the entire light-field video stream. The camera pathway may advantageously be provided with six degrees of freedom, as mentioned previously.

3D mapping of targets and/or target pixels. If desired, the targets may be modeled in a virtual 3D scene, and the camera pathway may be generated relative to the virtual 3D scene.

The step 550 may track the 3D movement of the light-field camera with accuracy sufficient to enable visually precise insertion of computer-generated content into the light-field video stream. As part of the step 550, the motion of the light-field camera may be tracked with six degrees of freedom, and the targets may be mapped in 3D space. Depth mapping may be carried out as a necessary by-product of generation of the camera pathway.

As shown, the step 550 may begin 1110 with a step 1120 in which the light-field video stream is divided into sequences. Each sequence may begin with one of the key frames identified in the step 540.

In a step 1130, one of the sequences may be selected. For the first iteration, this may be the first sequence of the light-field video stream. The targets and target pixels of the first key frame may already have been selected in the step 540.

In a step 1140, the position and/or orientation of the targets may be tracked, in each frame of the sequence. In a step 1150, the position and/or orientation of the targets may be compared between frames of the sequence to obtain a portion of the camera pathway corresponding to that sequence. This may be done, for example, by comparing each pair of adjacent frames, modeling the position and/or orientation of each target for the new frame, and building the camera pathway for the new frame. Thus, the step 1140 and the step 1150 may be carried out synchronously.

Thus, the 3D model (map) of the targets and the camera pathway may be propagated from the key frame to the last frame of the sequence, which may be the key frame of the next sequence. Accordingly, the camera pathway may be generated one frame at a time until the portion of the camera pathway for that sequence is complete. At the end of the sequence, in a step 1160, the position and/or orientation of the target pixels in the key frame at the beginning of the next sequence may be obtained.

In a query 1170, a determination may be made as to whether the camera pathway has been generated for all sequences designated in the step 1120. If not, the system may return to the step 1130 and select the next sequence in the light-field video stream. The step 1140, the step 1150, and the step 1160 may be repeated until the query 1170 is answered in the affirmative. The step 550 may then end 1190.

If desired, user input may be gathered at any point in the performance of the step 550. For example, the user may help identify new targets and/or target pixels, confirm whether the 3D model of targets and/or target pixels is correct, and/or confirm whether each new portion of the camera pathway is correct. Thus, propagation of errors through the process may be avoided.

Image Stabilization

As described in connection with FIG. 5, in the step 560, the camera pathway obtained in the step 550 may be adjusted, for example, to provide image stabilization. Specifically, the camera pose may be stabilized through all frames via splines or other analytical solutions. The multi-view (4D) nature of the light-field may allow for adjusting the projection coordinates of the individual frames. This may be done by adjusting the U, V coordinates within each light-field frame so that frame-to-frame motion is smooth and continuous.

By using 4D data, parallax and image resolution can be maintained, avoiding the losses inherent in known image stabilization methods for 2D images. The limits of perspective shift may be governed by the specifications of the light-field optics. By generating an adjusted camera pathway in 3D space, using the camera pathway, a new sample from the 4D light-field can be produced, thus generating a near parallax-perfect camera move.

Figure 12:
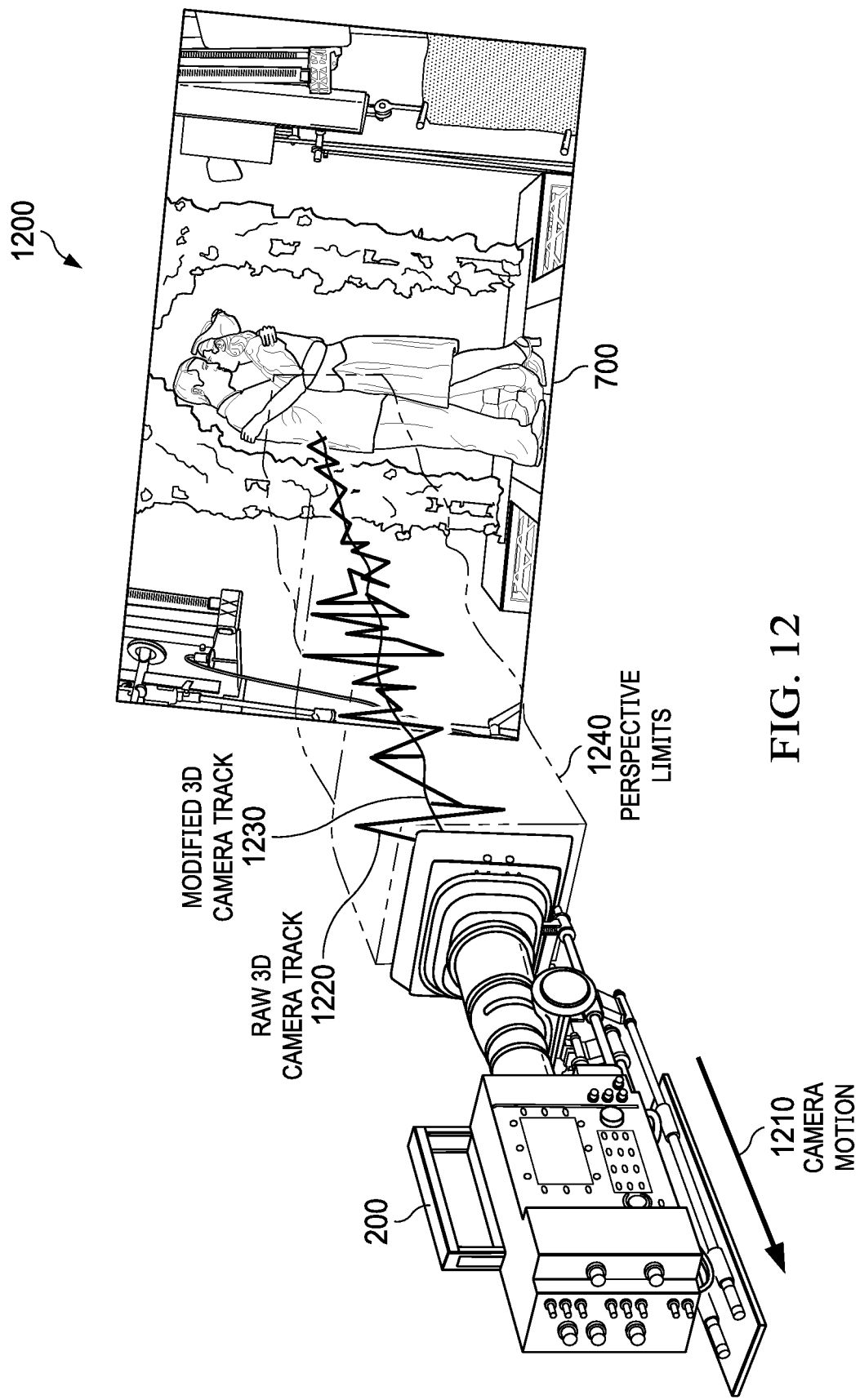
FIG. 12 is an illustration depicting the relationship between camera acceleration curves and light-field optical constraints, according to one embodiment.

FIG. 12 is an illustration 1200 depicting the relationship between camera acceleration curves and light-field optical constraints, according to one embodiment. As shown, the light-field camera 200 may be used to capture a light-field video stream including the frame 700 of FIG. 7. The light-field camera 200 may be dollied away from the scene, as indicated by the arrow 1210. If the motion of the light-field camera 200 is not smooth, the camera 200 may follow a camera pathway 1220 with an erratic, jittery shape. This may adversely impact the quality of the video projected from the light-field video stream.

The camera pathway 1220 may be obtained with relatively high accuracy through use of the methods provided herein. Then, the camera pathway 1220 may be adjusted (for example, by using splines or the like), to generate the adjusted camera pathway 1230, which is much smoother. The configuration and/or positioning of the light-field optics within the light-field camera 200, such as the main lens 213, the microlens array 202, and the image sensor 203, may determine the size of the perspective limits 1240, within which the Center of Perspective of the light-field video stream may be adjusted for each frame.

A much smoother video stream may be projected from the light-field video stream, from the viewpoint of the adjusted camera pathway 1230. This video stream may be outputted to a display screen or the like for viewing.

Integration of Other Sensors

As mentioned previously, other sensors may be used to enable still more accurate generation of the camera pathway 1220. For example, camera position and/or orientation data derived from such sensors may be compared with that of the camera pathway 1220 computed by 3D mapping the targets and/or target pixels in 3D space. If desired, such sensor data may be used for each sequence, or even each frame-by-frame progression, of the step 540.

Figure 13:
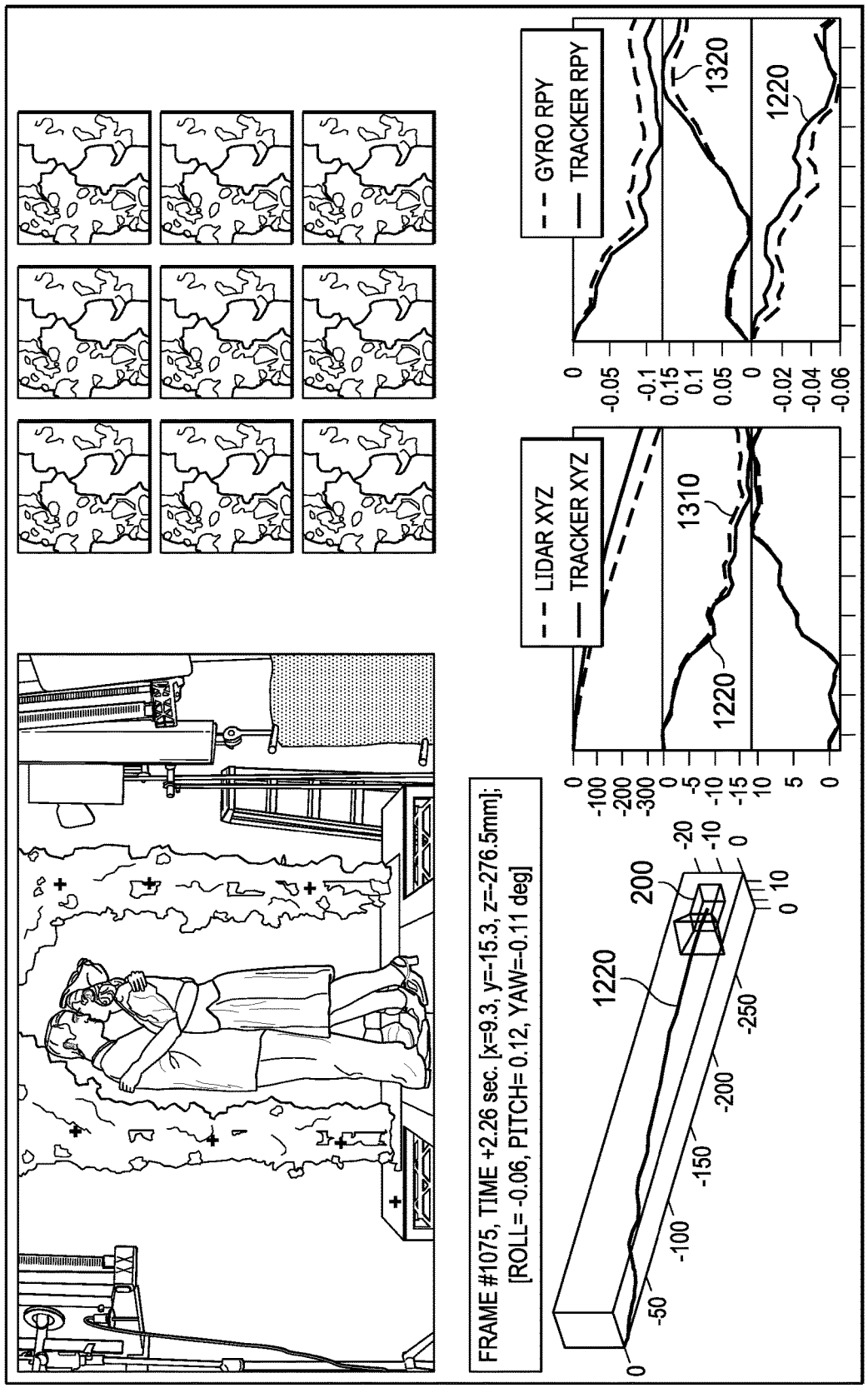
FIG. 13 is a screenshot depicting the use of LiDAR and gyroscope data in combination with a light-field video stream to generate more accurate camera pathways.

FIG. 13 is a screenshot 1300 depicting the use of LiDAR and gyroscope data in combination with a light-field video stream to generate more accurate camera pathways. Specifically, the screenshot 1300 depicts the camera pathway 1220, which may be computed by 3D mapping the targets and/or target pixels in 3D space, as described previously. The camera pathway 1220 generated in this way may be compared with a corresponding camera pathway 1310 generated through use of LiDAR data, and/or a corresponding camera pathway 1320 generated through the use data from a gyroscope mounted on the camera 200.

Such comparison may be performed manually by a user, or automatically by the computing device. The camera pathway 1220 may, if desired, be modified based on the corresponding camera pathway 1310 and/or the corresponding camera pathway 1320. Such modification may also be carried out manually or automatically, and may be done in the course of performance of the step 540. In the alternative, distinct camera pathways may be computed in their entirety, and then compared and/or modified after the step 540 is complete.

The above description and referenced drawings set forth particular details with respect to possible embodiments. Those of skill in the art will appreciate that the techniques described herein may be practiced in other embodiments. First, the particular naming of the components, capitalization of terms, the attributes, data structures, or any other programming or structural aspect is not mandatory or significant, and the mechanisms that implement the techniques described herein may have different names, formats, or protocols. Further, the system may be implemented via a combination of hardware and software, as described, or entirely in hardware elements, or entirely in software elements. Also, the particular division of functionality between the various system components described herein is merely exemplary, and not mandatory; functions performed by a single system component may instead be performed by multiple components, and functions performed by multiple components may instead be performed by a single component.

Reference in the specification to "one embodiment" or to "an embodiment" means that a particular feature, structure, or characteristic described in connection with the embodiments is included in at least one embodiment. The appearances of the phrase "in one embodiment" in various places in the specification are not necessarily all referring to the same embodiment.

Some embodiments may include a system or a method for performing the above-described techniques, either singly or in any combination. Other embodiments may include a computer program product comprising a non-transitory computer-readable storage medium and computer program code, encoded on the medium, for causing a processor in a computing device or other electronic device to perform the above-described techniques.

Some portions of the above are presented in terms of algorithms and symbolic representations of operations on data bits within a memory of a computing device. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "displaying" or "determining" or the like, refer to the action and processes of a computer system, or similar electronic computing module and/or device, that manipulates and transforms data represented as physical (electronic) quantities within the computer system memories or registers or other such information storage, transmission or display devices.

Certain aspects include process steps and instructions described herein in the form of an algorithm. It should be noted that the process steps and instructions of described herein can be embodied in software, firmware and/or hardware, and when embodied in software, can be downloaded to reside on and be operated from different platforms used by a variety of operating systems.

Some embodiments relate to an apparatus for performing the operations described herein. This apparatus may be specially constructed for the required purposes, or it may comprise a general-purpose computing device selectively activated or reconfigured by a computer program stored in the computing device. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, flash memory, solid state drives, magnetic or optical cards, application specific integrated circuits (ASICs), and/or any type of media suitable for storing electronic instructions, and each coupled to a computer system bus. Further, the computing devices referred to herein may include a single processor or may be architectures employing multiple processor designs for increased computing capability.

The algorithms and displays presented herein are not inherently related to any particular computing device, virtualized system, or other apparatus. Various general-purpose systems may also be used with programs in accordance with the teachings herein, or it may prove convenient to construct more specialized apparatus to perform the required method steps. The required structure for a variety of these systems will be apparent from the description provided herein. In addition, the techniques set forth herein are not described with reference to any particular programming language. It will be appreciated that a variety of programming languages may be used to implement the techniques described herein, and any references above to specific languages are provided for illustrative purposes only.

Accordingly, in various embodiments, the techniques described herein can be implemented as software, hardware, and/or other elements for controlling a computer system, computing device, or other electronic device, or any combination or plurality thereof. Such an electronic device can include, for example, a processor, an input device (such as a keyboard, mouse, touchpad, trackpad, joystick, trackball, microphone, and/or any combination thereof), an output device (such as a screen, speaker, and/or the like), memory, long-term storage (such as magnetic storage, optical storage, and/or the like), and/or network connectivity, according to techniques that are well known in the art. Such an electronic device may be portable or nonportable. Examples of electronic devices that may be used for implementing the techniques described herein include: a mobile phone, personal digital assistant, smartphone, kiosk, server computer, enterprise computing device, desktop computer, laptop computer, tablet computer, consumer electronic device, television, set-top box, or the like. An electronic device for implementing the techniques described herein may use any operating system such as, for example: Linux; Microsoft Windows, available from Microsoft Corporation of Redmond, Wash.; Mac OS X, available from Apple Inc. of Cupertino, Calif.; iOS, available from Apple Inc. of Cupertino, Calif.; Android, available from Google, Inc. of Mountain View, Calif.; and/or any other operating system that is adapted for use on the device.

In various embodiments, the techniques described herein can be implemented in a distributed processing environment, networked computing environment, or web-based computing environment. Elements can be implemented on client computing devices, servers, routers, and/or other network or non-network components. In some embodiments, the techniques described herein are implemented using a client/server architecture, wherein some components are implemented on one or more client computing devices and other components are implemented on one or more servers. In one embodiment, in the course of implementing the techniques of the present disclosure, client(s) request content from server(s), and server(s) return content in response to the requests. A browser may be installed at the client computing device for enabling such requests and responses, and for providing a user interface by which the user can initiate and control such interactions and view the presented content.

Any or all of the network components for implementing the described technology may, in some embodiments, be communicatively coupled with one another using any suitable electronic network, whether wired or wireless or any combination thereof, and using any suitable protocols for enabling such communication. One example of such a network is the Internet, although the techniques described herein can be implemented using other networks as well.

While a limited number of embodiments has been described herein, those skilled in the art, having benefit of the above description, will appreciate that other embodiments may be devised which do not depart from the scope of the claims. In addition, it should be noted that the language used in the specification has been principally selected for readability and instructional purposes, and may not have been selected to delineate or circumscribe the inventive subject matter. Accordingly, the disclosure is intended to be illustrative, but not limiting.

What is claimed is:

1. A method for processing a light-field video stream, the method comprising:
   at a processor, receiving a light-field video stream generated by a light-field camera;
   at the processor, selecting a plurality of target pixels in a plurality of key frames comprising at least a first frame and a second frame of the light-field video stream, wherein selecting the plurality of target pixels comprises selecting as target pixels those pixels having at least one of a predetermined color characteristic or a predetermining intensity characteristic and are selected from planar regions of static, textured objects appearing in the key frames of the light-field video stream as the target pixels, and wherein selecting the plurality of target pixels further comprises:
   generating a list of a plurality of targets appearing in at least one of the key frames;
   generating a plane model of each of the targets for each of the key frames; and
   generating a mask for each of the targets for each of the key frames, indicating one or more target pixels within each of the targets;
   at the processor, using the target pixels to generate, in three dimensions, a camera pathway indicative of motion of the light-field camera during generation of the light-field video stream; and
   at the processor, using the generated camera pathway to process the light-field video stream.

2. The method of claim 1, wherein selecting the plurality of target pixels further comprises:
   performing superpixel segmentation of each of the key frames to identify superpixels;
   calculating a motion error map for each of the key frames;
   using the superpixels and motion error maps to assess texture and motion error for each of the superpixels of each of the key frames to identify a plurality of the superpixels as candidate targets;
   fitting a plane to each of the candidate targets for each of the key frames; and
   selecting the targets from among the candidate targets.

3. The method of claim 1, wherein using the generated camera pathway to process the light-field video stream comprises:
   adjusting the camera pathway to generate an adjusted camera pathway; and
   projecting the light-field video stream to a viewpoint defined by the adjusted camera pathway to generate a projected video stream;
   wherein the method further comprises, at an output device, outputting the projected video stream.

4. A method for processing a light-field video stream, the method comprising:

at a processor, receiving a light-field video stream generated by a light-field camera;

at the processor, selecting a plurality of target pixels in a plurality of key frames comprising at least a first frame and a second frame of the light-field video stream, wherein selecting the plurality of target pixels comprises selecting as target pixels those pixels having at least one of a predetermined color characteristic or a predetermining intensity characteristic;

at the processor, using the target pixels to generate, in three dimensions, a camera pathway indicative of motion of the light-field camera during generation of the light-field video stream;

at the processor, using the generated camera pathway to process the light-field video stream; and wherein using the target pixels to generate the camera pathway comprises:
  receiving at least one selection from the group consisting of:
    camera-intrinsic parameters obtained from calibration of the light-field camera;
    light-field optics parameters pertinent to one or more light-field optical elements of the light-field camera; and
    camera motion, generated by a sensor operating contemporaneously with capture of the light-field video stream, indicative of motion of the light-field camera during at least a segment of the light-field video stream; and
  using the selection to generate the camera pathway.

5. The method of claim 4, wherein using the target pixels to generate the camera pathway comprises:
  generating the camera pathway with six degrees of freedom for an entirety of the light-field video stream; and
  generating a 3D mapping of the target pixels.

6. A method for processing a light-field video stream, the method comprising:
  at a processor, receiving a light-field video stream generated by a light-field camera;
  at the processor, selecting a plurality of target pixels in a plurality of key frames comprising at least a first frame and a second frame of the light-field video stream;
  at the processor, using the target pixels to generate, in three dimensions, a camera pathway indicative of motion of the light-field camera during generation of the light-field video stream, wherein using the target pixels to generate the camera pathway comprises:
    dividing the light-field video stream into a plurality of sequences, each of which begins with one of the key frames;
    for each sequence:
      tracking a position and/or orientation of each of the target pixels in each frame;
      comparing the position and/or orientation of each of the target pixels between frames of the sequence to obtain a portion of the camera pathway for that sequence; and
      obtaining the position and/or orientation of each of the target pixels for the key frame for the next sequence;
    generating the camera pathway with six degrees of freedom for an entirety of the light-field video stream; and
    generating a 3D mapping of the target pixels; and
  at the processor, using the generated camera pathway to process the light-field video stream.

7. The method of claim 6, wherein using the generated camera pathway to process the light-field video stream comprises:
  adjusting the camera pathway to generate an adjusted camera pathway; and
  projecting the light-field video stream to a viewpoint defined by the adjusted camera pathway to generate a projected video stream;
  wherein the method further comprises, at an output device, outputting the projected video stream.

8. The method of claim 7, wherein adjusting the camera pathway to generate the adjusted camera pathway comprises causing the adjusted camera pathway to be more stable than the camera pathway.

9. The method of claim 7, wherein adjusting the camera pathway to generate the adjusted camera pathway further comprises adjusting U, V coordinates within each of a plurality of frames of the light-field video stream to cause frame-to-frame motion to be relatively smooth and contiguous.

10. A non-transitory computer-readable medium for processing a light-field video stream, comprising instructions stored thereon, that when executed by one or more processors, perform the steps of:
  receiving a light-field video stream generated by a light-field camera;
  selecting a plurality of target pixels in a plurality of key frames comprising at least a first frame and a second frame of the light-field video stream, wherein selecting the plurality of target pixels comprises:
    selecting pixels with predetermined color and/or intensity characteristics by selecting pixels from planar regions of static, textured objects appearing in the key frames of the light-field video stream as the target pixels by:
      generating a list of a plurality of targets appearing in at least one of the key frames;
      generating a plane model of each of the targets for each of the key frames; and
      generating a mask for each of the targets for each of the key frames, indicating one or more target pixels within each of the targets;
  using the target pixels to generate, in three dimensions, a camera pathway indicative of motion of the light-field camera during generation of the light-field video stream; and
  using the generated camera pathway to process the light-field video stream.

11. The non-transitory computer-readable medium of claim 10, wherein selecting the plurality of target pixels further comprises:
  performing superpixel segmentation of each of the key frames to identify superpixels;
  calculating a motion error map for each of the key frames;
  using the superpixels and motion error maps to assess texture and motion error for each of the superpixels of each of the key frames to identify a plurality of the superpixels as candidate targets;
  fitting a plane to each of the candidate targets for each of the key frames; and
  selecting the targets from among the candidate targets.

12. The non-transitory computer-readable medium of claim 10, wherein using the generated camera pathway to process the light-field video stream comprises:
  adjusting the camera pathway to generate an adjusted camera pathway such that the adjusted camera pathway is more stable than the camera pathway;

projecting the light-field video stream to a viewpoint defined by the adjusted camera pathway to generate a projected video stream;

wherein the non-transitory computer-readable medium further comprises instructions stored thereon, that when executed by one or more processors, cause an output device to output the projected video stream.

13. A system for processing a light-field video stream, the system comprising:

a processor configured to:
  receive a light-field video stream generated by a light-field camera;
  select a plurality of target pixels in a plurality of key frames comprising at least a first frame and a second frame of the light-field video stream by:
    selecting pixels from planar regions of static, textured objects appearing in the key frames of the light-field video stream as the target pixels;
    generating a list of a plurality of targets appearing in at least one of the key frames;
    generating a plane model of each of the targets for each of the key frames; and
    generating a mask for each of the targets for each of the key frames, indicating one or more target pixels within each of the targets;
  use the target pixels to generate, in three dimensions, a camera pathway indicative of motion of the light-field camera during generation of the light-field video stream; and
  use the generated camera pathway to process the light-field video stream; and
an output device configured to output the light-field video stream.

14. The system of claim 13, wherein the processor is further configured to select the plurality of target pixels by:
  performing superpixel segmentation of each of the key frames to identify superpixels;
  calculating a motion error map for each of the key frames;
  using the superpixels and motion error maps to assess texture and motion error for each of the superpixels of each of the key frames to identify a plurality of the superpixels as candidate targets;
  fitting a plane to each of the candidate targets for each of the key frames; and
  selecting the targets from among the candidate targets.

15. The system of claim 13, wherein the processor is further configured to use the target pixels to generate the camera pathway by:
  receiving at least one selection from the group consisting of:
    camera-intrinsic parameters obtained from calibration of the light-field camera;
    light-field optics parameters pertinent to one or more light-field optical elements of the light-field camera; and
    camera motion, generated by a sensor operating contemporaneously with capture of the light-field video stream, indicative of motion of the light-field camera during at least a segment of the light-field video stream; and
  using the selection to generate the camera pathway.

16. The system of claim 13, wherein the processor is further configured to use the generated camera pathway to process the light-field video stream by:
  adjusting the camera pathway to generate an adjusted camera pathway such that the adjusted camera pathway is more stable than the camera pathway; and
  projecting the light-field video stream to a viewpoint defined by the adjusted camera pathway to generate a projected video stream;
  and wherein the output device is further configured to output the projected video stream.

17. A system for processing a light-field video stream, the system comprising:

a processor configured to:
  receive a light-field video stream generated by a light-field camera;
  select a plurality of target pixels in a plurality of key frames comprising at least a first frame and a second frame of the light-field video stream;
  use the target pixels to generate, in three dimensions, a camera pathway with six degrees of freedom and indicative of motion of the light-field camera during generation of the light-field video stream by:
    dividing the light-field video stream into a plurality of sequences, each of which begins with one of the key frames; and
    for each sequence:
      tracking a position and/or orientation of each of the target pixels in each frame;
      comparing the position and/or orientation of each of the target pixels between frames of the sequence to obtain a portion of the camera pathway for that sequence; and
      obtaining the position and/or orientation of each of the target pixels for the key frame for the next sequence; and
    generating a 3D mapping of the target pixels;
  use the generated camera pathway to process the light-field video stream; and
an output device configured to output the light-field video stream.

18. The system of claim 17, wherein the processor is further configured to use the generated camera pathway to process the light-field video stream by:
  adjusting the camera pathway to generate an adjusted camera pathway such that the adjusted camera pathway is more stable than the camera pathway; and
  projecting the light-field video stream to a viewpoint defined by the adjusted camera pathway to generate a projected video stream;
  and wherein the output device is further configured to output the projected video stream.

* * * * *